US012201111B2

(12) United States Patent
Hemminghaus et al.

(10) Patent No.: US 12,201,111 B2
(45) Date of Patent: Jan. 21, 2025

(54) GLYPHOSATE FORMULATIONS CONTAINING AMIDOALKYLAMINE SURFACTANTS

(71) Applicant: Monsanto Technology LLC, St. Louis, MO (US)

(72) Inventors: John W. Hemminghaus, St. Louis, MO (US); Andrew D. Dyszlewski, St. Louis, MO (US); Mojahedul Islam, Whitehouse Station, NJ (US); Shawn Zhu, Stormville, NY (US); Hua Yu, Scarsdale, NY (US)

(73) Assignee: Monsanto Technology LLC, St. Louis, MO (US)

( * ) Notice: Subject to any disclaimer, the term of this patent is extended or adjusted under 35 U.S.C. 154(b) by 0 days.

(21) Appl. No.: 17/820,574

(22) Filed: Aug. 18, 2022

(65) Prior Publication Data

US 2022/0386595 A1 Dec. 8, 2022

Related U.S. Application Data

(63) Continuation of application No. 16/300,260, filed as application No. PCT/US2017/031915 on May 10, 2017, now Pat. No. 11,452,289.

(60) Provisional application No. 62/334,656, filed on May 11, 2016.

(51) Int. Cl.
*A01N 57/20* (2006.01)
*A01N 25/30* (2006.01)

(52) U.S. Cl.
CPC ............ *A01N 25/30* (2013.01); *A01N 57/20* (2013.01)

(58) Field of Classification Search
None
See application file for complete search history.

(56) References Cited

U.S. PATENT DOCUMENTS

| | | | |
|---|---|---|---|
| 3,799,758 A | 3/1974 | Franz | |
| 3,853,530 A | 12/1974 | Franz | |
| 3,977,860 A | 8/1976 | Franz | |
| 4,140,513 A | 2/1979 | Prill | |
| 4,315,765 A | 2/1982 | Large | |
| 4,405,531 A | 9/1983 | Franz | |
| 4,481,026 A | 11/1984 | Prisbylla | |
| 4,507,250 A | 3/1985 | Bakel | |
| 5,118,444 A | 6/1992 | Nguyen | |
| 5,863,863 A | 1/1999 | Hasebe et al. | |
| 5,958,439 A | 9/1999 | Gubelmann | |
| 6,165,939 A | 12/2000 | Agbaje et al. | |
| 6,277,788 B1 | 8/2001 | Wright | |
| 6,365,551 B1 | 4/2002 | Wright et al. | |
| 6,455,473 B2 | 9/2002 | Wright | |
| 6,544,930 B2 | 4/2003 | Wright | |
| 6,667,276 B1 | 12/2003 | Maier et al. | |
| 6,747,164 B2 | 6/2004 | Gustavsson et al. | |
| 6,881,707 B2 | 4/2005 | Howat et al. | |
| 6,992,045 B2 | 1/2006 | Xu et al. | |
| 7,008,904 B2 | 3/2006 | Crockett et al. | |
| 7,049,270 B2 | 5/2006 | Lennon et al. | |
| 7,060,659 B2 | 6/2006 | Killick et al. | |
| 7,135,437 B2 | 11/2006 | Pallas et al. | |
| 8,236,730 B2 | 8/2012 | Bramati et al. | |
| 2002/0160918 A1 | 10/2002 | Lewis et al. | |
| 2003/0087764 A1 | 5/2003 | Pallas et al. | |
| 2003/0096708 A1 | 5/2003 | Agbaje et al. | |
| 2003/0176286 A1 | 9/2003 | Gustavsson | |
| 2004/0097372 A1 | 5/2004 | Abraham et al. | |
| 2005/0026781 A1 | 2/2005 | Wright et al. | |
| 2005/0261130 A1 | 11/2005 | Lennon et al. | |
| 2006/0019828 A1 | 1/2006 | Becher et al. | |
| 2006/0019830 A1 | 1/2006 | Xu et al. | |
| 2006/0040826 A1 | 2/2006 | Eaton et al. | |
| 2006/0094602 A1 | 5/2006 | Killick et al. | |

(Continued)

FOREIGN PATENT DOCUMENTS

| | | |
|---|---|---|
| DE | 19953274 A1 | 5/2001 |
| WO | 9632839 A2 | 10/1996 |

(Continued)

OTHER PUBLICATIONS

Bergstrom et al., "Amido propyl amines—new adjuvant class for agrochemicals", The BCPC International Congress—Crop Science & Technology, 2005, pp. 459-464.
Akzo Nobel Surface Chemistry LLC Brochure by Akzo Nobel and Agro Applications, "Surface Chemistry Agro Applications", 2003 (4), 88 pages.
Product Overview Surfactants Europe, Akzo Nobel Surface Chemistry AB, 2006 (7), 42 pages.
Surfactant News, "Adsee C80W—A New Glyphosate Adjuvant", by Markus Jonsson, 2007, 1 page.

(Continued)

*Primary Examiner* — Alton N Pryor
(74) *Attorney, Agent, or Firm* — Stinson LLP

(57) ABSTRACT

An herbicidal composition comprising (a) glyphosate or a derivative thereof, (b) an amidoalkylamine surfactant of formula (1):

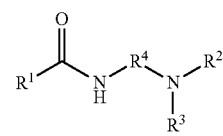

wherein $R_1$ is a hydrocarbyl having from about 1 carbon atoms to about 22 carbon atoms, $R_2$ and $R_3$ are each independently hydrocarbyl or substituted hydrocarbyl having from 1 to about 6 carbon atoms and $R_4$ is hydrocarbylene or substituted hydrocarbylene having from 1 to about 6 carbon atoms and (c) a co-surfactant component comprising at least one co-surfactant selected from, for example, alkoxylated tertiary amine oxides, amidoamine alkoxylates, and betaines.

20 Claims, No Drawings

(56) References Cited

U.S. PATENT DOCUMENTS

| | | |
|---|---|---|
| 2006/0148648 A1 | 7/2006 | Crockett et al. |
| 2006/0270556 A1 | 11/2006 | Wright et al. |
| 2009/0318294 A1 | 12/2009 | Malec et al. |
| 2010/0113274 A1 | 5/2010 | Hemminghaus et al. |
| 2010/0234228 A1 | 9/2010 | Lennon et al. |
| 2011/0210028 A1 | 9/2011 | Zhu |
| 2011/0263430 A1 | 10/2011 | Seifert-Higgins et al. |
| 2012/0157313 A1 | 6/2012 | Zhu et al. |

FOREIGN PATENT DOCUMENTS

| | | |
|---|---|---|
| WO | 9700010 A1 | 1/1997 |
| WO | 9700126 A1 | 1/1997 |
| WO | 0030452 A1 | 6/2000 |
| WO | 0108482 A1 | 2/2001 |
| WO | 0117358 A1 | 3/2001 |
| WO | 0132019 A1 | 5/2001 |
| WO | 0195720 A1 | 12/2001 |
| WO | 0221924 A2 | 3/2002 |
| WO | 0232227 A1 | 4/2002 |
| WO | 02069718 A2 | 9/2002 |
| WO | 02096199 A2 | 12/2002 |
| WO | 2004019681 A2 | 3/2004 |
| WO | 2006023431 A2 | 3/2006 |
| WO | 2006034426 A1 | 3/2006 |
| WO | 2006111563 A1 | 10/2006 |
| WO | 2006127501 A2 | 11/2006 |
| WO | 2008068214 A2 | 6/2008 |
| WO | 2009082675 A1 | 7/2009 |
| WO | 2011026800 A2 | 3/2011 |
| WO | 2011034444 A1 | 3/2011 |

OTHER PUBLICATIONS

Muzyczko, T.M., et al., "Fatty Amidoamine Derivatives: N,N-Dimethyl-N-(3-alkylamidopropyl)amines and Their Salts," 1968, Journal of American Oil Chemists' Society, 45:720-725.

International Search Report and Written Opinion issued in PCT/US2017/31915 dated Aug. 11, 2017, 9 pages.

Huntsman, Ethyleneamines A Global Profile of Products and Services, 2007, pp. 76.

GLYPHOSATE FORMULATIONS CONTAINING AMIDOALKYLAMINE SURFACTANTS

CROSS-REFERENCE TO RELATED APPLICATIONS

This application is a continuation of U.S. patent application Ser. No. 16/300,260, filed Nov. 9, 2018, which is the 371 National Stage Application of International Patent Application No. PCT/US2017/031915, filed May 10, 2017, which claims the benefit of U.S. Provisional Application No. 62/334,656, filed May 11, 2016, the contents of which are incorporated herein in their entirety.

FIELD OF THE INVENTION

The present invention generally relates to herbicidal compositions comprising glyphosate and surfactant blends comprising an amidoalkylamine surfactant and certain co-surfactants.

BACKGROUND OF THE INVENTION

N-phosphonomethylglycine ("glyphosate") is an effective post-emergent foliar-applied herbicide. In its acid form, the structure of glyphosate is:

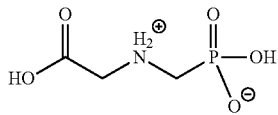

Since glyphosate in its acid form is relatively insoluble in water (1.16% by weight at 25° C.), it is typically formulated as a water-soluble salt. Glyphosate is typically formulated as a monobasic, dibasic, or tribasic salt.

Typical glyphosate salts include, for example, the mono (isopropylammonium) ("IPA"), potassium, sodium, monoethanolammonium ("MEA"), trimethylsulfonium ("TMS"), ammonium, diammonium salts, n-propylamine, ethylamine, ethylenediamine, and hexamethylenediamine salts. One of the more widely used salts of glyphosate is the IPA salt present in the commercial herbicide ROUNDUP from Monsanto Company.

Glyphosate salts are typically co-formulated with a surfactant to maximize herbicidal efficacy. However, the development of concentrated glyphosate formulations in the range of 480 g a.e./L to 700 g a.e./L is challenging due to the limited compatibility of surfactants at high glyphosate loadings. In this context and throughout this specification "g a.e./L" means grams acid equivalent per liter of solution, which refers to the concentration of glyphosate in its acid form.

SUMMARY OF THE INVENTION

Provided herein are compositions comprising glyphosate or a derivative thereof (e.g., a salt or ester thereof), an amidoalkylamine surfactant, and at least one co-surfactant.

For example, provided herein is an aqueous herbicidal concentrate composition comprising (a) glyphosate or a derivative thereof;

(b) an amidoalkylamine surfactant of formula (1):

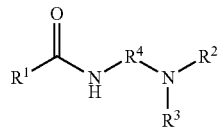

wherein $R^1$ is alkyl or alkenyl, each optionally substituted and having an average of from about 4 carbon atoms to about 22 carbon atoms, $R^2$ and $R^3$ are independently alkyl having from 1 to 4 carbon atoms, and $R^4$ is alkylene having from 1 to 4 carbon atoms; and (c) a co-surfactant component comprising at least one co-surfactant selected from the group consisting of:

an alkoxylated tertiary amine oxide of formula (2):

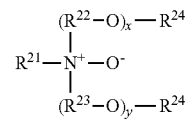

wherein $R^{21}$ is a straight or branched chain hydrocarbyl having an average of from about 5 carbon atoms to about 22 carbon atoms; $R^{22}$ in each of the ($R^{22}$—O) groups is independently selected from $C_1$-$C_4$ alkylene, wherein at least one $R^{22}$ is different from at least one other $R^{22}$; $R^{23}$ in each of the ($R^{23}$—O) groups is independently selected from $C_1$-$C_4$ alkylene; each $R^{24}$ is independently selected from hydrogen and $C_1$-$C_4$ alkyl; and x and y are average numbers such that x is at least 2 and the sum of x and y is from 3 to about 30;

a co-surfactant of formula (3):

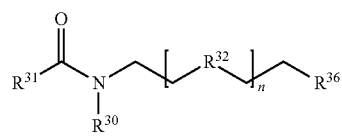

wherein $R^{31}$ is a straight or branched chain hydrocarbyl having an average of from about 5 carbon atoms to about 22 carbon atoms; $R^{30}$ is selected from hydrogen and ($R^{34}$—O)$_m$ $R^{35}$; each $R^{32}$ is independently selected from $NR^{301}$ and $(N^+)R^{301}R^{302}$, and $R^{36}$ is selected from $NR^{301}R^{303}$ and $(N^+)R^{301}R^{303}R^{304}$; wherein each $R^{301}$ is independently selected from hydrogen, $C_1$-$C_4$ alkyl, $C(O)R^{33}$ and ($R^{34}$—O)$_m R^{35}$; each $R^{302}$ is independently selected from the group consisting of oxygen, $C_1$-$C_4$ alkyl, and ($R^{34}$—O)$_m R^{35}$; and each $R^{303}$ and $R^{304}$ is independently selected from hydrogen, $C_1$-$C_5$ alkyl and ($R^{34}$—O)$_m R^{35}$; wherein each $R^{33}$ is independently a straight or branched chain hydrocarbyl having an average of from about 5 carbon atoms to about 22 carbon atoms or $OR^{331}$, wherein each $R^{331}$ is independently hydrogen or a salt-forming cation; $R^{34}$ in each of the ($R^{34}$—O) groups is independently selected from $C_{1-4}$ alkylene; and $R^{35}$ is independently selected from hydrogen and $C_1$-$C_4$ alkyl; each m is an average number such that the sum of every m is from 1 to about 30; and n is from 0 to 3;

a co-surfactant comprising a betaine of formula (4):

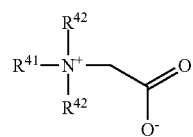

(4)

wherein $R^{41}$ is a straight or branched chain hydrocarbyl having an average of from about 5 carbon atoms to about 22 carbon atoms; and each $R^{42}$ is independently selected from $C_1$-4 alkyl and $(R^{43}—O)_m R^{44}$, wherein $R^{43}$ in each of the $(R^{43}—O)$ groups is independently selected from $C_{1-4}$ alkylene, each $R^{44}$ is independently selected from hydrogen and $C_1$-$C_4$ alkyl, and each m is an average number such that the sum of every m is from 1 to about 30;

a co-surfactant of formula (5a):

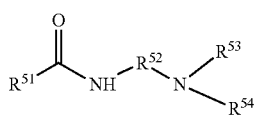

(5a)

wherein $R^{51}$ is a substituted hydrocarbyl having an average of from about 5 carbon atoms to about 22 carbon atoms derived from a triglyceride, fatty acid, or methylester of a fatty acid and comprising at least one pendant hydroxyl or alkoxy group on the hydrocarbon chain; $R^{52}$ is $C_{1-4}$ alkylene; and $R^{53}$ and $R^{54}$ are each independently selected from $C_{1-4}$ alkyl and $(R^{56}—O)_m R^{57}$, wherein $R^{56}$ in each of the $(R^{56}—O)$ groups is independently selected from $C_{1-4}$ alkylene, each $R^{57}$ is independently selected from hydrogen and $C_1$-$C_4$ alkyl, and each m is an average number such that the sum of every m is from 1 to about 30;

a co-surfactant of formula (5b):

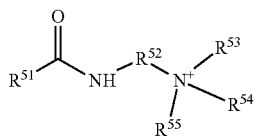

(5b)

wherein $R^{51}$ is a substituted hydrocarbyl having an average of from about 5 carbon atoms to about 22 carbon atoms derived from a triglyceride, fatty acid, or methylester of a fatty acid and comprising at least one pendant hydroxyl or alkoxy group on the hydrocarbon chain; $R^{52}$ is $C_{1-4}$ alkylene; $R^{53}$ and $R^{54}$ are each independently selected from $C_{1-4}$ alkyl and $(R^{56}—O)_m R^{57}$, wherein $R^{56}$ in each of the $(R^{56}—O)$ groups is independently selected from $C_{1-4}$ alkylene, each $R^{57}$ is independently selected from hydrogen and $C_1$-$C_4$ alkyl, and each m is an average number such that the sum of every m is from 1 to about 30; and $R^{55}$ is selected from $CH_2CO_2^-$ and oxygen; and a co-surfactant of formula (5c):

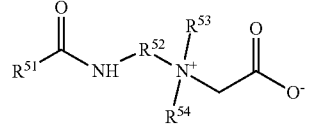

(5c)

wherein $R^{51}$ is a substituted hydrocarbyl having an average of from about 5 carbon atoms to about 22 carbon atoms derived from a triglyceride, fatty acid, or methylester of a fatty acid and comprising at least one pendant hydroxyl or alkoxy group on the hydrocarbon chain; $R^{52}$ is $C_{1-4}$ alkylene; and $R^{53}$ and $R^{54}$ are each independently selected from $C_{1-4}$ alkyl and $(R^{56}—O)_m R^{57}$, wherein $R^{56}$ in each of the $(R^{56}—O)$ groups is independently selected from $C_{1-4}$ alkylene, each $R^{57}$ is independently selected from hydrogen and $C_1$-$C_4$ alkyl, and each m is an average number such that the sum of every m is from 1 to about 30. The co-surfactant component can comprise any combination of co-surfactants of formula (2), formula (3), formula (4), formula (5a), formula (5b) and/or formula (5c).

In accordance with one embodiment, the co-surfactant component of the aqueous herbicidal concentrate composition comprises an alkoxylated tertiary amine oxide of formula (2):

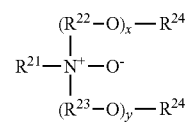

(2)

wherein $R^{21}$ is a straight or branched chain hydrocarbyl having an average of from about 5 carbon atoms to about 22 carbon atoms;
  $R^{22}$ in each of the $(R^{22}—O)$ groups is independently selected from $C_1$-$C_4$ alkylene, wherein at least one $R^{22}$ is different from at least one other $R^{22}$;
  $R^{23}$ in each of the $(R^{23}—O)$ groups is independently selected from $C_1$-$C_4$ alkylene;
  each $R^{24}$ is independently selected from hydrogen and $C_1$-$C_4$ alkyl; and
  x and y are average numbers such that x is at least 2 and the sum of x and y is from 3 to about 30.

In accordance with another embodiment, the co-surfactant component of the aqueous herbicidal concentrate composition comprises a co-surfactant of formula (3):

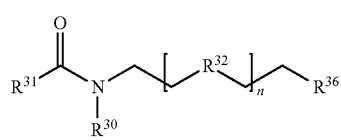

(3)

wherein $R^{31}$ is a straight or branched chain hydrocarbyl having an average of from about 5 carbon atoms to about 22 carbon atoms; $R^{30}$ is selected from hydrogen and $(R^{34}—O)_m R^{35}$; each $R^{32}$ is independently selected from $NR^{301}$ and $(N^+)R^{301}R^{302}$; and $R^{36}$ is selected from $NR^{301}R^{303}$ and $(N^+)R^{301}R^{303}R^{304}$;
  wherein each $R^{301}$ is independently selected from hydrogen, $C_1$-$C_4$ alkyl, $C(O)R^{33}$ and $(R^{34}—O)_m R^{35}$; each $R^{302}$ is independently selected from the group consisting of oxygen, $C_1$-$C_4$ alkyl, and $(R^{34}$—$O)_m R^{35}$; and each $R^{303}$ and $R^{304}$ is independently selected from hydrogen, $C_1$-$C_5$ alkyl and $(R^{34}$—$O)_m R^{35}$;

wherein each $R^{33}$ is independently a straight or branched chain hydrocarbyl having an average of from about 5 carbon atoms to about 22 carbon atoms or $OR^{331}$, wherein each $R^{331}$ is independently hydrogen or a salt-forming cation; $R^{34}$ in each of the $(R^{34}$—$O)$ groups is independently selected from $C_{1-4}$ alkylene; and $R^{35}$ is independently selected from hydrogen and $C_1$-$C_4$ alkyl;

each m is an average number such that the sum of every m is from 1 to about 30; and n is from 0 to 3.

In accordance with another embodiment, the co-surfactant component of the aqueous herbicidal concentrate composition comprises a betaine of formula (4):

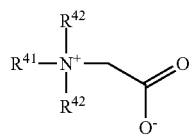

(4)

wherein $R^{41}$ is a straight or branched chain hydrocarbyl having an average of from about 5 carbon atoms to about 22 carbon atoms; and each $R^{42}$ is independently selected from $C_{1-4}$ alkyl and $(R^{43}$—$O)_m R^{44}$, wherein $R^{43}$ in each of the $(R^{43}$—$O)$ groups is independently selected from $C_{1-4}$ alkylene, each $R^{44}$ is independently selected from hydrogen and $C_1$-$C_4$ alkyl, and each m is an average number such that the sum of every m is from 1 to about 30.

In accordance with another embodiment, the co-surfactant component of the aqueous herbicidal concentrate composition comprises a co-surfactant of formula (5a):

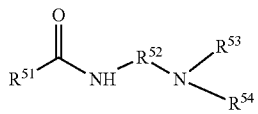

(5a)

wherein $R^{51}$ is a substituted hydrocarbyl having an average of from about 5 carbon atoms to about 22 carbon atoms derived from a triglyceride, fatty acid, or methylester of a fatty acid and comprising at least one pendant hydroxyl or alkoxy group on the hydrocarbon chain; $R^{52}$ is $C_{1-4}$ alkylene; and $R^{53}$ and $R^{54}$ are each independently selected from $C_{1-4}$ alkyl and $(R^{56}$—$O)_m R^{57}$, wherein $R^{56}$ in each of the $(R^{56}$—O) groups is independently selected from $C_{1-4}$ alkylene, each $R^{57}$ is independently selected from hydrogen and $C_1$-$C_4$ alkyl, and each m is an average number such that the sum of every m is from 1 to about 30.

In accordance with another embodiment, the co-surfactant component of the aqueous herbicidal concentrate composition comprises a co-surfactant of formula (5b):

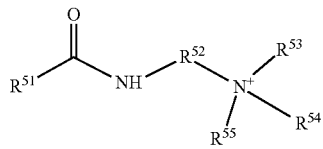

(5b)

wherein $R^{51}$ is a substituted hydrocarbyl having an average of from about 5 carbon atoms to about 22 carbon atoms derived from a triglyceride, fatty acid, or methylester of a fatty acid and comprising at least one pendant hydroxyl or alkoxy group on the hydrocarbon chain; $R^{52}$ is $C_{1-4}$ alkylene; $R^{53}$ and $R^{54}$ are each independently selected from $C_{1-4}$ alkyl and $(R^{56}$—$O)_m R^{57}$, wherein $R^{56}$ in each of the $(R^{56}$—O) groups is independently selected from $C_{1-4}$ alkylene, each $R^{57}$ is independently selected from hydrogen and $C_1$-$C_4$ alkyl, and each m is an average number such that the sum of every m is from 1 to about 30; and $R^{55}$ is selected from $CH_2CO_2^-$ and oxygen.

In accordance with a still further embodiment, the co-surfactant component of the aqueous herbicidal concentrate composition comprises a co-surfactant of formula (5c):

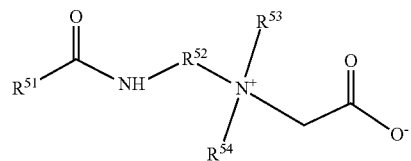

(5c)

wherein $R^{51}$ is a substituted hydrocarbyl having an average of from about 5 carbon atoms to about 22 carbon atoms derived from a triglyceride, fatty acid, or methylester of a fatty acid and comprising at least one pendant hydroxyl or alkoxy group on the hydrocarbon chain; $R^{52}$ is $C_{1-4}$ alkylene; and $R^{53}$ and $R^{54}$ are each independently selected from $C_{1-4}$ alkyl and $(R^{56}$—$O)_m R^{57}$, wherein $R^{56}$ in each of the $(R^{56}$—O) groups is independently selected from $C_{1-4}$ alkylene, each $R^{57}$ is independently selected from hydrogen and $C_1$-$C_4$ alkyl, and each m is an average number such that the sum of every m is from 1 to about 30.

Also provided herein is a method of killing or controlling weeds or unwanted vegetation comprising diluting a composition described herein in an amount of water to form an application mixture; and applying a herbicidally effective amount of the application mixture to foliage of the weeds or unwanted vegetation.

Other objects and features will be in part apparent and in part pointed out hereinafter.

DESCRIPTION OF THE EMBODIMENT(S) OF THE INVENTION

In general, the present invention is directed to an herbicidal composition comprising glyphosate or a derivative thereof (e.g., a salt or ester thereof), an amidoalkylamine surfactant, and a co-surfactant component comprising at least one co-surfactant. Generally, the co-surfactant component may include one or more co-surfactants of formulas (2), (3), (4), (5a), (5b) and (5c) as described herein and may be selected from among, for example, alkoxylated tertiary amine oxides, amidoamine alkoxylates, and betaines.

Generally, the composition may be an aqueous or solid herbicidal concentrate having a high load of glyphosate component or a ready to use formulation ("RTU") prepared by the dilution of herbicidal concentrates with water.

The high load glyphosate concentrates of the present invention are possible through the use of amidoalkylamine surfactants, which have been discovered to be compatible with a wide variety of glyphosate salts. For example, these surfactants have been discovered to be compatible with the diammonium salt, the potassium salt, and the monoethanolamine salt of glyphosate and enable the preparation of stable concentrates even at high concentrations of those glyphosate salts.

It has been further discovered that amidoalkylamine surfactants are efficient coupling agents to a variety of co-surfactants, including, for example, the alkoxylated tertiary amine oxides, amidoamine alkoxylates, and betaines described herein. Advantageously, the combination of an amidoalkylamine surfactant and certain co-surfactants enables the preparation of compositions having high concentrations of both glyphosate salt and surfactant. For example, compositions having a glyphosate salt concentration of from 360 g a.e./L to 650 g a.e./L, coupled with a surfactant loading of from 80 g a.e./L to 200 g a.e./L can be successfully prepared. The combination of an amidoalkylamine surfactant and co-surfactants as described herein enables the preparation of high load glyphosate formulations that exhibit long-term storage stability. The use of amidoalkylamine surfactants enables the preparation of high load glyphosate formulations comprising a higher proportion (relative to the total surfactant concentration) of co-surfactant, which further improves the bioefficacy of the herbicidal compositions described herein.

Moreover, it has been discovered that the use of a surfactant blend comprising an amidoalkylamine surfactant coupled with at least one other co-surfactant may improve the compatibility of glyphosate compositions with co-herbicides, particularly when such co-herbicides are tank-mixed with dilute, ready-to-use formulations just prior to use.

It has yet been further discovered that the glyphosate formulations of the present invention comprising surfactant blends as described herein may exhibit low levels of eye irritation, skin toxicity, and environmental toxicity.

The glyphosate component of the compositions of the present invention is typically primarily responsible for plant suppression or death (i.e., bioefficacy) and is instrumental in imparting long-term herbicidal control. The glyphosate component comprises glyphosate acid and/or agronomically acceptable derivatives thereof. Derivatives include salts, esters, or compounds which are converted to glyphosate in plant tissues or which otherwise provide glyphosate anions. In this regard it is to be noted that the term "glyphosate," "glyphosate derivative," and "glyphosate component" when used herein is understood to encompass glyphosate, derivatives and mixtures thereof unless the context requires otherwise. Furthermore, the term "agronomically acceptable" includes glyphosate derivatives that allow agriculturally and economically useful herbicidal activity of a glyphosate anion in residential or industrial applications.

In the aqueous herbicidal compositions of the present invention, it is preferred that the glyphosate component predominantly comprise one or more of the more water-soluble salts of glyphosate. As used throughout this specification, the expression "predominantly comprises" means more than 50%, for example at least about 75%, at least about 90%, at least about 95%, at least about 98%, at least about 99%, or at least about 99.9% by weight of the component of the herbicidal composition is made up of the specified compound(s). A glyphosate component predominantly comprising one or more of the various salts of glyphosate is preferred in part because their increased water solubility allows formulation of highly concentrated herbicidal compositions that can be easily transported and readily diluted with water in the preparation of sprayable RTU compositions at the site of intended use.

Suitable salts of glyphosate include monobasic, dibasic, or tribasic salts and include organic amines, alkali metal, alkaline earth metal, ammonium (e.g., monoammonium, diammonium, or triammonium) and sulfonium (e.g., monosulfonium, disulfonium, or trimethylsulfonium ("TMS") salts of glyphosate. The organic amine salts can comprise aliphatic or aromatic amine salts and can include primary, secondary, tertiary, or quaternary amine salts. Specific representative examples of such organic amine salts include isopropylamine ("IPA"), n-propylamine, ethylamine, dimethylamine ("DMA"), monoethanolamine ("MEA"), triethanolamine ("TEA"), ethylenediamine and hexamethylenediamine salts of glyphosate. Specific representative examples of alkali metal salts include potassium and sodium salts of glyphosate. In accordance with more preferred embodiments of the invention, the glyphosate component predominantly comprises a salt of glyphosate selected from the potassium, monoammonium, diammonium, sodium, MEA, n-propylamine, IPA, ethylamine, DMA, ethylenediamine, hexamethylenediamine and TMS salts and combinations thereof. Of these, the MEA, diammonium, and potassium salts and combinations thereof are especially preferred.

Previous studies have indicated that the various salts of glyphosate have considerable differences in their compatibility with surfactants. In some instances, it has been shown that the potassium salt of glyphosate is advantageous due to the high solubility in water and the resulting high density that allows for higher loading of the active in formulations. However, potassium glyphosate offers limited compatibility with common surfactants used with glyphosate. One aspect of the current invention is, therefore, the capability of amidoalkylamine surfactants to improve compatibility of potassium glyphosate with surfactants in a high load glyphosate formulation. The use of amidoalkylamine surfactants enables the preparation of glyphosate formulations with higher active and surfactant loadings, as well as increased levels of alkoxylation of co-surfactants, for example tertiary amine oxide surfactants.

It has also been observed that certain of the other salts of glyphosate are difficult to formulate at loadings of, for example, about 540 g a.e./L, or higher, such as about 600 g a.e./L and higher in combination with a surfactant component. The other salts of glyphosate have been observed to offer better compatibility with surfactants compared to the potassium salt. For example, monoethanolamine (MEA) glyphosate has been observed to be more compatible with a wider variety of surfactants. However, the limited solubility and density of the MEA salt of glyphosate is a limiting factor in the formulation of a liquid herbicidal concentrate. In this regard, blends of two or more salts of glyphosate may allow for the preparation of highly loaded formulations containing amidoalkylamine coupling agents blended with a co-surfactant at higher levels than when formulated with potassium salt of glyphosate alone.

For example, in some instances, the herbicidal composition of the present invention comprises a blend of the potassium salt of glyphosate and the monoethanolamine salt of glyphosate. The weight ratio of the potassium salt of glyphosate in grams acid equivalent to the monoethanolamine salt of glyphosate in grams acid equivalent may be between about 1:1 to about 4:1, such as about 7:3. In some preferred embodiments, the weight ratio of the potassium salt of glyphosate in grams acid equivalent to the monoethanolamine salt of glyphosate in grams acid equivalent is about 7:3, which enables weight ratios of co-surfactants to amidoalkylamine coupling agents to vary from at least about 60:40, to at least about 65:35, and in some cases to at least about 70:30.

In other instances, the herbicidal composition comprises a blend of the potassium salt of glyphosate and the ammonium salt of glyphosate; a blend of the isopropylammonium salt of glyphosate and the ammonium salt of glyphosate; a blend of the potassium salt of glyphosate and the isopropylamine salt of glyphosate; a blend of the potassium salt of glyphosate and the triethanolamine salt of glyphosate; or a blend of the dimethylamine salt of glyphosate and the triethanolamine salt of glyphosate. In some instances, these glyphosate salts may generally be combined in a ratio of from about 1:4 to about 4:1 (e.g., in a ratio of about 1:1 to about 4:1).

The herbicidal compositions of the present invention can be formulated as aqueous solutions. The term "aqueous," as used herein, refers to compositions comprising water in an amount that renders it the predominant solvent. "Aqueous" is not intended to exclude the presence of nonaqueous (i.e., organic) solvents, as long as water is present. Examples of suitable nonaqueous solvents include toluene, xylenes, petroleum naphtha, tetrahydrofurfuryl alcohol, ethylene glycol, polyethylene glycol, propylene glycol, ethanol, and hexanol.

The concentration of the glyphosate component in an aqueous herbicidal concentrate according to the present invention is typically at least about 300 grams acid equivalent per liter ("g a.e./L"), such as at least about 360 g a.e./L, or such as at least about 390 g a.e./L. In preferred compositions of the invention, glyphosate concentration is not lower than 400 g a.e./L or about 420 g a.e./L, in particularly preferred compositions not lower than about 480 g a.e./L, about 500 g a.e./L, about 540 g a.e./L, about 580 g a.e./L, about 600 g a.e./L, or even about 620 g a.e./L, for example about 480 to about 540 g a.e./L, or about 480 to about 600 g a.e./L, or more. Accordingly, in some instances, the concentration of the glyphosate component in a herbicidal concentrate may be between about 300 g a.e./L and about 600 g a.e./L, between about 420 g a.e./L and about 600 g a.e./L, or between about 480 g a.e./L and about 540 g a.e./L. In preferred herbicidal concentrate compositions, they concentration of the glyphosate component may be from about 480 g a.e./L to about 620 g a.e./L, for example from about 480 g a.e./L to about 600 g a.e./L, or from about 540 to about 620 g a.e./L. It is believed that the upper limit of glyphosate concentration in a storage-stable surfactant-containing composition of the invention is in excess of about 650 g a.e./L, e.g., to about 700 g a.e./L, this limit being a consequence of the solubility limit of glyphosate and glyphosate salts in water, compounded by further limitation due to the presence of surfactant.

The solid concentrate compositions of the invention preferably comprise glyphosate or a derivative thereof in a concentration of greater than 30% by weight acid equivalent of the composition, such as from about 30% to about 90% by weight acid equivalent of the composition, such as from about 40% to about 90% by weight acid equivalent of the composition, more preferably from about 50% to about 80% by weight acid equivalent of the composition.

The present invention is further directed to RTU formulations prepared by diluting herbicidal concentrates with appropriate amounts of water. The concentration of the glyphosate component in aqueous RTU compositions of the present invention is typically at least about 1 g a.e./L, and generally from about 1 g a.e./L to about 50 g a.e./L. In order to provide more economical RTU formulations providing prolonged herbicidal activity, the concentration of the glyphosate component in the RTU composition is more preferably from about 5 g a.e./L to about 20 g a.e./L.

The compositions of the present invention comprise one or more amidoalkylamine surfactants. Amidoalkylamine surfactants added to the formulation may enhance the stability of high load glyphosate concentrates and/or enhance the bioefficacy when combined with at least one other co-surfactant. The amidoalkylamine surfactants have the general structure of formula (1):

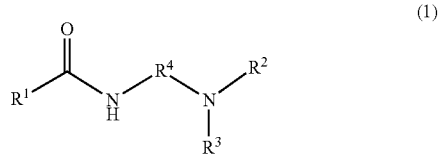

(1)

wherein $R^1$ is a hydrocarbyl or substituted hydrocarbyl having from 1 to about 22 carbon atoms, $R^2$ and $R^3$ are each independently hydrocarbyl or substituted hydrocarbyl having from 1 to about 6 carbon atoms and $R^4$ is hydrocarbylene or substituted hydrocarbylene having from 1 to about 6 carbon atoms.

$R^1$ is preferably alkyl or alkenyl, each optionally substituted and having an average value of carbon atoms between about 4 to about 22 carbon atoms, preferably an average value between about 4 and about 18 carbon atoms, more preferably an average value from about 4 to about 12 carbon atoms, more preferably an average value from about 5 to about 12 carbon atoms, even more preferably an average value from about 6 to about 12 carbon atoms, and still more preferably an average value from about 6 to about 10 carbon atoms. The $R^1$ alkyl group may be derived from a variety of sources that provide alkyl groups having from about 4 to about 18 carbon atoms, for example, the source may be butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, or octadecanoic acid. The $R^1$ alkyl or alkenyl group may also be derived from coco (comprising mainly dodecanoic acid), palm (e.g., tetradecanoic acid derived from palm oil), soy (comprising mainly linoleic acid, oleic acid, and hexadecanoic acid), TOFA (tall oil fatty acid), rapeseed (comprising mainly erucic acid and glucosinolate), low erucic acid rapeseed, or tallow (comprising mainly hexadecanoic acid, oleic acid, and octadecanoic acid). In some embodiments, the amidoalkylamine surfactant component may comprise a blend of amidoalkylamines having alkyl and/or alkenyl chains of various lengths from about 5 carbon atoms to about 12 carbon atoms. For example, depending upon the source of the $R^1$ alkyl and/or alkenyl group, an amidoalkylamine surfactant component may comprise a blend of surfactants having $R^1$ groups that are 5 carbon atoms in length, 6 carbon atoms in length, 7 carbon atoms in length, 8 carbon atoms in length, 9 carbon atoms in length, 10 carbon atoms in length, 11 carbon atoms in length, and 12 carbon atoms in length, longer carbon chains, and combinations thereof. In other embodiments, the amidoalkylamine surfactant component may comprise a blend of surfactants having $R^1$ groups that are 5 carbon atoms in length, 6 carbon atoms in length, 7 carbon atoms in length, and 8 carbon atoms in length. In some alternative embodiments, the amidoalkylamine surfactant component may comprise a blend of surfactants having $R^1$ groups that are 6 carbon atoms in length, 7 carbon atoms in length, 8 carbon atoms in length, 9 carbon atoms in length, and 10 carbon atoms in length. In other embodiments, the amidoalkylamine surfactant component may comprise a blend of surfactants having $R^1$ groups that are 8 carbon atoms in length, 9 carbon atoms in length, 10 carbon atoms in length, 11 carbon atoms in length, and 12 carbon atoms in length.

$R^2$ and $R^3$ are independently preferably an alkyl or substituted alkyl having from 1 to about 4 carbon atoms. $R^2$ and $R^3$ are most preferably independently an alkyl having from 1 to about 4 carbon atoms, and most preferably methyl. $R^4$ is preferably an alkylene or substituted alkylene having from 1 to about 4 carbon atoms. $R^4$ is most preferably an alkylene having from 1 to about 4 carbon atoms, and most preferably n-propylene.

In some instances, the amidoalkylamine surfactant is a compound of formula (1) wherein $R^1$ is alkyl having an average of from about 4 carbon atoms to about 18 carbon atoms, $R^2$ and $R^3$ are independently alkyl having from 1 to 4 carbon atoms, and $R^4$ is alkylene having from 1 to 4 carbon atoms.

For example, the amidoalkylamine surfactant may be a compound of formula (1) wherein $R^1$ is $C_{6-10}$, i.e., an alkyl group having 6 carbon atoms, 7 carbon atoms, 8 carbon atoms, 9 carbon atoms, 10 carbon atoms, or a blend of any of these, i.e., from about 6 carbon atoms to about 10 carbon atoms; $R^2$ and $R^3$ are each methyl; and $R^4$ is n-propylene (i.e., $C_{6-10}$ amidopropyl dimethylamine).

Based on experimental evidence to date, amidoalkylamine surfactants of formula (1) have been shown to be compatible with the various water soluble salts of glyphosate, particularly potassium, isopropylammonium, ammonium, monoethanolamine, triethanolamine, dimethylamine, and diammonium salts of glyphosate, and combinations of glyphosate salts, such as a blend of the potassium salt of glyphosate and the monoethanolamine salt of glyphosate, a blend of the potassium salt of glyphosate and the ammonium salt of glyphosate, a blend of the isopropylammonium salt of glyphosate and the ammonium salt of glyphosate, a blend of the potassium salt of glyphosate and the isopropylamine salt of glyphosate, a blend of the potassium salt of glyphosate and the triethanolamine salt of glyphosate, and a blend of the dimethylamine salt of glyphosate and the triethanolamine salt of glyphosate.

In herbicidal compositions described herein, the amidoalkylamine surfactant of formula (1) may act as a coupling agent in combination with an additional surfactant component, which is also referred to herein as a co-surfactant. The additional surfactant component may be selected from among, for example, alkoxylated tertiary amine oxides, amidoamine alkoxylates, betaines, or combinations thereof.

For example, the compositions described herein may comprise an alkoxylated tertiary amine oxide co-surfactant of formula (2):

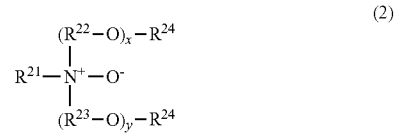

wherein
$R^{21}$ is a straight or branched chain hydrocarbyl having an average of from about 5 carbon atoms to about 22 carbon atoms;
$R^{22}$ in each of the ($R^{22}$—O) groups is independently selected from $C_1$-$C_4$ alkylene, wherein at least one $R^{22}$ is different from at least one other $R^{22}$;
$R^{23}$ in each of the ($R^{23}$—O) groups is independently selected from $C_1$-$C_4$ alkylene;
each $R^{24}$ is independently selected from hydrogen and $C_1$-$C_4$ alkyl; and
x and y are average numbers such that x is at least 2 and the sum of x and y is from 3 to about 30.

In each of the compounds of formula (2) described herein, $R^{21}$ may be a straight-chain alkyl having an average of from about 5 to about 22 carbon atoms. For example, $R^{21}$ may be a straight-chain alkyl having an average of from about 8 to about 18 carbon atoms, from about 10 to about 18 carbon atoms, or from about 12 to about 18 carbons atoms. In some instances, $R^{21}$ is coco or tallow.

Each $R^{22}$ may be independently selected from $C_2$-$C_4$ alkylene. For example, each $R^{22}$ can be independently selected from the group consisting of ethylene and propylene, such that at least one $R^{22}$ is ethylene and at least one $R^{22}$ is propylene.

Similarly, each $R^{23}$ may be independently selected from $C_2$-$C_4$ alkylene. For example, each $R^{23}$ can be independently selected from the group consisting of ethylene and propylene. In some instances, at least one $R^{23}$ is different from at least one other $R^{23}$. For example, $R^{23}$ may be selected so that at least one $R^{23}$ is ethylene and at least one $R^{23}$ is propylene.

For example, in some embodiments, the composition comprises a compound of formula (2) wherein at least one $R^{22}$ is ethylene and at least one $R^{22}$ is propylene, and wherein at least one $R^{23}$ is ethylene and at least one $R^{23}$ is propylene.

In each of the compounds described herein, each $R^{24}$ may be independently selected from the group consisting of hydrogen and methyl. For example, each $R^{24}$ can be hydrogen. In other instances, at least one $R^{24}$ is methyl.

The sum of x and y can be from 3 to about 20, for example from about 4 to about 18, or from about 5 to about 15.

In some instances, the alkoxylated tertiary amine oxide co-surfactant of Formula (2) may be a compound of Formula (2a):

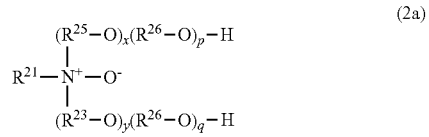

wherein
$R^{21}$ is a straight or branched chain hydrocarbyl having an average of from about 5 carbon atoms to about 22 carbon atoms;
$R^{25}$ is $C_{1-4}$ alkylene;

$R^{26}$ is a $C_{1-4}$ alkylene different from $R^{25}$; and x, y, p, and q are each independently average numbers greater than or equal to 1, such that the sum of x, y, p, and q is from 4 to about 20.

$R^{25}$ may be selected from $C_2$-$C_4$ alkylene, and is preferably selected from ethylene and propylene. Similarly, $R^{26}$ may be selected from $C_2$-$C_4$ alkylene, and is preferably selected from ethylene and propylene, provided that $R^{26}$ is different from $R^{25}$. For example, in some instances, $R^{25}$ is ethylene and $R^{26}$ is propylene. In other instances, $R^{25}$ is propylene and $R^{26}$ is ethylene.

In some instances, the sum of the sum of x and y is from about 3 to about 12, or more typically from about 5 to about 10. The sum of p and q may range from 0.5 to about 5, from 1 to about 3, or more typically from 1 to about 2. The sum of x, y, p, and q may range from about 4 to about 18, or more typically from about 5 to about 15.

Specific alkoxylated tertiary amine oxide co-surfactants for use in the herbicidal compositions of the present invention include, for example, a compound of formula (2a) wherein $R^{21}$ is coco, $R^{25}$ is ethylene, $R^{26}$ is propylene, the sum of x and y is about 9, and the sum of p and q is about 2.

The compositions described herein may comprise a co-surfactant component comprising a compound of formula (3):

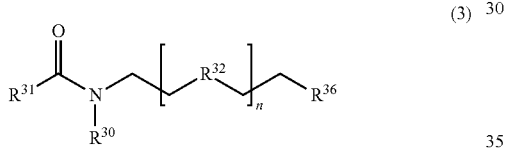

(3)

wherein $R^{31}$ is a straight or branched chain hydrocarbyl having an average of from about 5 carbon atoms to about 22 carbon atoms;

$R^{30}$ is selected from hydrogen and $(R^{34}$—$O)_m R^{35}$;

each $R^{32}$ is independently selected from $NR^{301}$ and $(N^+)R^{301}R^{302}$; and $R^{36}$ is selected from $NR^{301}R^{303}$ and $(N^+)R^{301}R^{303}R^{304}$;

wherein each $R^{301}$ is independently selected from hydrogen, $C_1$-$C_4$ alkyl, $C(O)R^{33}$ and $(R^{34}$—$O)_m R^{35}$; each $R^{302}$ is independently selected from the group consisting of oxygen, $C_1$-$C_4$ alkyl, and $(R^{34}$—$O)_m R^{35}$; and each $R^{303}$ and $R^{304}$ is independently selected from hydrogen, $C_1$-$C_5$ alkyl and $(R^{34}$—$O)_m R^{35}$;

and wherein each $R^{33}$ is independently a straight or branched chain hydrocarbyl having an average of from about 5 carbon atoms to about 22 carbon atoms or $OR^{331}$, wherein each $R^{331}$ is independently hydrogen or a salt-forming cation; $R^{34}$ in each of the ($R^{34}$—O) groups is independently selected from $C_{1-4}$ alkylene; and each $R^{35}$ is independently selected from hydrogen and $C_1$-$C_4$ alkyl;

each m is an average number such that the sum of every m is from 1 to about 30; and n is from 0 to 3.

In each of the compounds of formula (3) described herein, $R^{31}$ or $R^{33}$ may be a straight-chain or branched alkyl comprising from about 5 to about 22 carbon atoms. For example, $R^{31}$ or $R^{33}$ may be a straight-chain alkyl comprising from about 8 to about 18 carbon atoms, or from about 12 to about 18 carbons atoms. In some instances, $R^{31}$ is derived from coco, tallow, TOFA, rapeseed, low erucic acid rapeseed, or soy.

In each of the compounds of formula (3) described herein, $R^{30}$ may be hydrogen.

In each of the compounds of formula (3), the compound can exist in several forms, including as a mono- or di-amidoamine. The compositions of the present disclosure can contain only the mono- or di-amidoamine or both the mono- and di-amidoamine in the same composition.

In some instances, the compound of formula (3) in the co-surfactant component may be a compound of Formula (3a):

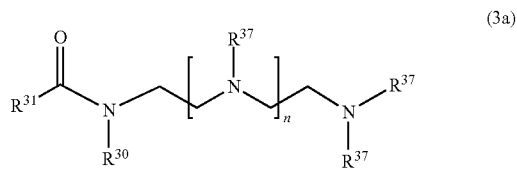

(3a)

wherein $R^{31}$ is a straight or branched chain hydrocarbyl having an average of from about 5 carbon atoms to about 22 carbon atoms;

$R^{30}$ is selected from hydrogen and $(R^{34}$—$O)_m R^{35}$;

each $R^{37}$ is independently selected from hydrogen, $C(O)R^{33}$ and $(R^{34}$—$O)_m R^{35}$, wherein each $R^{33}$ is independently a straight or branched chain $C_{5-22}$ alkyl group, $R^{34}$ in each of the ($R^{34}$—O) groups is independently selected from $C_{1-4}$ alkylene, each $R^{35}$ is independently selected from hydrogen and $C_1$-$C_4$ alkyl, and each m is an average number such that the sum of every m is from 1 to about 30; and n is from 0 to 3.

In some instances, one of the $R^{37}$ groups is $C(O)R^{33}$ and each of the remaining $R^{37}$ groups is $(R^{34}$—$O)_m R^{35}$. In other instances, each of the $R^{37}$ groups is $(R^{34}$—$O)_m R^{35}$.

The sum of every m can be from about 3 to about 24, from about 8 to about 24, or from about 14 to about 22.

In some instances, the compound of formula (3) in the co-surfactant component may be a compound of Formula (3b):

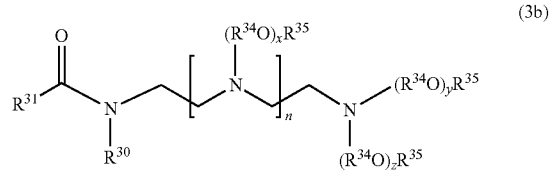

(3b)

wherein $R^{31}$ is a straight or branched chain hydrocarbyl having an average of from about 5 carbon atoms to about 22 carbon atoms;

$R^{30}$ is selected from hydrogen and $(R^{34}$—$O)_m R^{35}$;

$R^{34}$ in each of the ($R^{34}$—O) groups is independently selected from $C_{1-4}$ alkylene;

each $R^{35}$ is independently selected from hydrogen and $C_1$-$C_4$ alkyl;

n is from 0 to 3; and each m, x, y, and z is an average number such that the sum of every m, x, y, and z is an average number of from 1 to about 30.

In each of the compounds described herein, each $R^{34}$ may be independently selected from $C_2$-$C_4$ alkylene. For example, each $R^{34}$ can be independently selected from the group consisting of ethylene and propylene. In some instances, at least one $R^{34}$ is different from at least one other $R^{34}$. For example, in some instances at least one $R^{34}$ is ethylene and at least one $R^{34}$ is propylene. In some instances, at least one $R^{34}$ is different from at least one other $R^{34}$ in each of the x, y and z ($R^{34}$—O) groups.

In each of the compounds described herein, each $R^{35}$ may be independently selected from the group consisting of hydrogen and methyl. For example, each $R^{35}$ can be hydrogen. In other instances, at least one $R^{35}$ is methyl.

The sum of m, x, y, and z can be from 2 to about 20, for example from about 4 to about 18, or from about 5 to about 15

In some instances, the compound of formula (3) in the co-surfactant component may be a compound of Formula (3c):

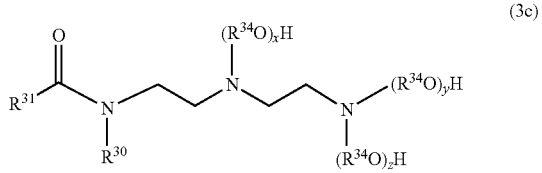

(3c)

wherein
$R^{31}$ is a straight or branched chain hydrocarbyl having an average of from about 5 carbon atoms to about 22 carbon atoms;
$R^{30}$ is selected from hydrogen and $(R^{34}$—$O)_m R^{35}$;
each $R^{34}$ is independently selected from $C_{1-4}$ alkylene; and
m, x, y, and z are average numbers such that the sum of m, x, y, and z is an average number of from 1 to about 30.

In some instances, $R^{31}$ is alkyl or alkenyl, each optionally substituted and having an average of from about 5 carbon atoms to about 22 carbon atoms.

The sum of m, x, y, and z may be be an average number of from about 3 to about 24, from about 8 to about 24, or from about 14 to about 22.

In some instances, compound of formula (3) in the co-surfactant component may be a compound of Formula (3d):

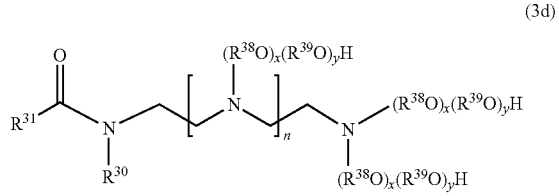

(3d)

wherein
$R^{31}$ is a straight or branched chain hydrocarbyl having an average of from about 5 carbon atoms to about 22 carbon atoms;
$R^{30}$ is selected from hydrogen and $(R^{34}$—$O)_m R^{35}$;
$R^{38}$ is $C_{1-4}$ alkylene;
$R^{39}$ is a $C_{1-4}$ alkylene different from $R^{38}$;
n is from 0 to 3; and
each m, x, and y is an average number such that the sum of every m, x, and y is from 1 to about 30.

$R^{38}$ may be selected from $C_2$-$C_4$ alkylene, and is preferably selected from ethylene and propylene. Similarly, $R^{39}$ may be selected from $C_2$-$C_4$ alkylene, and is preferably selected from ethylene and propylene, provided that $R^{39}$ is different from $R^{38}$. For example, in some instances, $R^{38}$ is ethylene and $R^{39}$ is propylene. In other instances, $R^{38}$ is propylene and $R^{39}$ is ethylene.

The sum of each x may be an average number of from about 3 to about 12, or from about 5 to about 10. The sum of each y may be an average number of from 0.5 to about 5, from 1 to about 3, or from 1 to about 2. The sum of every m, x, and y may be be an average number of from about 3 to about 24, from about 8 to about 24, or from about 14 to about 22.

Specific co-surfactants for use in the herbicidal compositions of the present invention include, for example, the surfactant from Akzo Nobel designated WITCAMINE 210 or ARMOHIB 210 18EO, which is a diethylenetriamine (DETA) amidoamine with an average ethoxylation of 18.

The compositions described herein may comprise a betaine co-surfactant of formula (4):

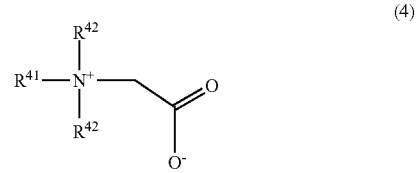

(4)

wherein
$R^{41}$ is a straight or branched chain hydrocarbyl having an average of from about 5 carbon atoms to about 22 carbon atoms; and
each $R^{42}$ is independently selected from $C_{1-4}$ alkyl and $(R^{43}$—$O)_m R^{44}$, wherein $R^{43}$ in each of the $(R^{43}$—O) groups is independently selected from $C_{1-4}$ alkylene, each $R^{44}$ is independently selected from hydrogen and $C_1$-$C_4$ alkyl, and each m is an average number such that the sum of every m is from 1 to about 30.

In each of the compounds of formula (4) described herein, $R^{41}$ is a straight-chain alkyl comprising from about 5 to about 22 carbon atoms. For example, $R^{41}$ may be a straight-chain alkyl comprising from about 8 to about 18 carbon atoms, or from about 12 to about 18 carbons atoms. In some instances, $R^{41}$ is coco or tallow.

In some instances, at least one $R^{42}$ is $(R^{43}$—$O)_m R^{44}$. For example, in some instances one $R^{42}$ is $C_{1-4}$ alkyl and the second $R^{42}$ is $(R^{43}$—$O)_m R^{44}$.

In each of the compounds described herein, each $R^{43}$ may be independently selected from $C_2$-$C_4$ alkylene. For example, each $R^{43}$ can be independently selected from the group consisting of ethylene and propylene. In some instances, at least one $R^{43}$ is different from at least one other $R^{43}$. For example, in some instances at least one $R^{43}$ is ethylene and at least one $R^{43}$ is propylene.

In each of the compounds described herein, each $R^{44}$ may be independently selected from the group consisting of hydrogen and methyl. For example, each $R^{44}$ can be hydrogen. In other instances, at least one $R^{44}$ is methyl.

For example, the betaine co-surfactant of formula (4) may be a compound of Formula (4a):

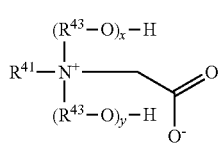

(4a)

wherein
$R^{41}$ is a straight or branched chain hydrocarbyl having an average of from about 5 carbon atoms to about 22 carbon atoms;
each $R^{43}$ is independently selected from $C_{1-4}$ alkylene; and
x and y are average numbers such that the sum of x and y is from 2 to about 20.

The sum of x and y can be from 2 to about 20, for example from about 4 to about 18, or from about 5 to about 15.

In other instances, the betaine co-surfactant of formula (4) may be a compound of Formula (4b):

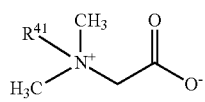

(4b)

wherein $R^{41}$ is a straight or branched chain hydrocarbyl having an average of from about 5 carbon atoms to about 22 carbon atoms.

Specific betaine co-surfactants for use in the herbicidal compositions of the present invention include, for example, the surfactant from Akzo Nobel designated AMPHOTEEN 24, which is an alkyl (coco) dimethyl betaine.

The compositions described herein may comprise a co-surfactant of formula (5a):

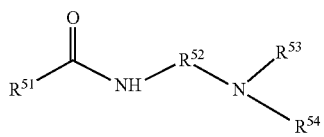

(5a)

wherein
$R^{51}$ is a substituted hydrocarbyl having an average of from about 5 carbon atoms to about 22 carbon atoms derived from a triglyceride, fatty acid, or methylester of a fatty acid and comprising at least one pendant hydroxyl or alkoxy group on the hydrocarbon chain;
$R^{52}$ is $C_{1-4}$ alkylene; and
$R^{53}$ and $R^{54}$ are each independently selected from $C_{1-4}$ alkyl and $(R^{56}-O)_m R^{57}$, wherein $R^{56}$ in each of the $(R^{56}-O)$ groups is independently selected from $C_{1-4}$ alkylene, each $R^{57}$ is independently selected from hydrogen and $C_1-C_4$ alkyl, and each m is an average number such that the sum of every m is from 1 to about 30.

In other instances, the compositions described herein may comprise a co-surfactant of formula (5b):

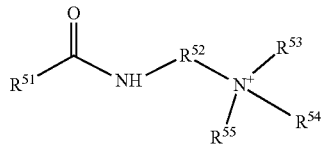

(5b)

wherein
$R^{51}$ is a substituted hydrocarbyl having an average of from about 5 carbon atoms to about 22 carbon atoms derived from a triglyceride, fatty acid, or methylester of a fatty acid and comprising at least one pendant hydroxyl or alkoxy group on the hydrocarbon chain;
$R^{52}$ is $C_{1-4}$ alkylene;
$R^{53}$ and $R^{54}$ are each independently selected from $C_{1-4}$ alkyl and $(R^{56}-O)_m R^{57}$, wherein $R^{56}$ in each of the $(R^{56}-O)$ groups is independently selected from $C_{1-4}$ alkylene, each $R^{57}$ is independently selected from hydrogen and $C_1-C_4$ alkyl, and each m is an average number such that the sum of every m is from 1 to about 30; and
$R^{55}$ is selected from $CH_2CO_2^-$ and oxygen.

For example, the compositions described herein may comprise a co-surfactant of formula (5c):

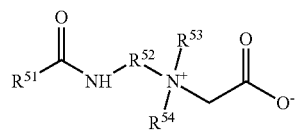

(5c)

wherein
$R^{51}$ is a substituted hydrocarbyl having an average of from about 5 carbon atoms to about 22 carbon atoms derived from a triglyceride, fatty acid, or methylester of a fatty acid and comprising at least one pendant hydroxyl or alkoxy group on the hydrocarbon chain;
$R^{52}$ is $C_{1-4}$ alkylene; and
$R^{53}$ and $R^{54}$ are each independently selected from $C_{1-4}$ alkyl and $(R^{56}-O)_m R^{57}$, wherein $R^{56}$ in each of the $(R^{56}-O)$ groups is independently selected from $C_{1-4}$ alkylene, each $R^{57}$ is independently selected from hydrogen and $C_1-C_4$ alkyl, and each m is an average number such that the sum of every m is from 1 to about 30.

In some instances, the composition comprises a co-surfactant of Formula (5a), (5b), or (5c) wherein $R^{51}$ is a substituted hydrocarbyl derived from a triglyceride, fatty acid, or methylester of a fatty acid and comprising at least one substituent $O(R^{512}-O)_m R^{513}$, wherein $R^{512}$ in each of the $(R^{512}-O)$ groups is independently selected from $C_{1-4}$ alkylene, each $R^{513}$ is independently selected from hydrogen and $C_1-C_4$ alkyl, and each m is an average number such that the sum of every m is from 1 to about 30.

In some instances, $R^{51}$ is derived from a hydroxoleic acid. For example, $R^{51}$ may be derived from castor oil.

In some instances $R^{52}$ is isopropylene.

Specific co-surfactants for use in the herbicidal compositions of the present invention include, for example, the surfactant from Akzo Nobel designated ACAR 14017.

With regard to the surfactant blend itself, the use of the amidoalkylamine surfactant as a coupling agent enables the preparation of high load glyphosate herbicidal concentrates of improved stability compared to formulations comprising conventional coupling agents. Stated another way, increasing the proportion of the co-surfactants normally decreases the stability of a high load glyphosate formulation when a conventional coupling agent is employed. The amidoalkylamine coupling agent enables the preparation of high load glyphosate formulations having higher proportions of co-surfactants that are stable as illustrated by long term storage stability and cloud point studies.

With regard to the surfactant blend, a concentration ratio of the amidoalkylamine surfactant in g/L to the co-surfactant in g/L may vary from 10:1 to about 1:10, more preferably from 8:1 to about 1:8, more preferably from 5:1 to about 1:5, and most preferably from 2:1 to about 1:2. Preferably, the concentration ratio of the amidoalkylamine surfactant in g/L to the co-surfactant in g/L is less than about 45:55, more preferably less than about 40:60, even more preferably less than about 35:65.

The pH of the herbicidal composition can contribute to the stability, cloud point, compatibilization of glyphosate salts with the surfactants used, and compatibilization with co-herbicides, if added. In this regard, the pH of an herbicidal composition comprising potassium glyphosate, for example, as its predominant glyphosate component may be from about 4 to about 8, such as from about 4.5 to about 5.5. In other embodiments, the pH of a herbicidal composition comprising diammonium glyphosate as its predominant glyphosate component may be from about 4 to about 8, such as from about 5 to about 7, such as from about 5.5 to about 6.5. pH adjusting agents for acidic adjustment include mineral acids such as, for example, hydrochloric acid, nitric acid or sulfuric acid, and organic acids such as, for example, acetic acid or dicarboxylic acids. pH adjusting agents for alkaline adjustment include, for example, sodium hydroxide, potassium hydroxide, ammonia, and organic bases, such as IPA, MEA, and DMA.

The herbicidal compositions may further comprise other conventional adjuvants, excipients, or additives known to those skilled in the art. These other additives or ingredients may be introduced into the compositions described herein to provide or improve certain desired properties or characteristics of the formulated product. Hence, the herbicidal composition may further comprise one or more additional ingredients selected from, without limitation, foam-moderating agents, surfactants, preservatives or anti-microbials, antifreeze agents, solubility-enhancing agents, dyes, pH adjusters and thickening agents.

The compositions may comprise one or more safening agents that inhibit plant injury caused by the presence of N-(phosphonomethyl)iminodiacetic acid ("PMIDA"). Suitable safening agents are described in U.S. Pat. No. 8,129,564, which is herein incorporated by reference in its entirety. Typically, the safening agent comprises a metal ion that is subject to formation of a complex or salt with N-(phosphonomethyl)iminodiacetic acid or an anion formed by deprotonation or partial deprotonation thereof, the formation of such complex or salt being effective to inhibit significant leaf necrosis in the crop of transgenic glyphosate-tolerant cotton plants induced by N-(phosphonomethyl)iminodiacetic acid or salt thereof present in the composition. For example, the composition may comprise a metal ion selected from the group consisting of aluminum, copper, iron, zinc, and mixtures thereof. In some instances, the composition comprises iron ions (e.g., ferric sulfate). In some instances, the composition further comprises a solubilizing ligand (e.g., citric acid).

Suitable surfactants are known to those skilled in the art and include cationic, nonionic, and anionic surfactants. These surfactants may be included in the herbicidal compositions described herein so long as they do not adversely affect the stability or compatibility of the surfactant component with the remainder of the glyphosate formulation.

Suitable classes of cationic surfactants include primary, secondary and tertiary alkylamines, primary, secondary and tertiary alkylaminium salts in which an amine group is substantially protonated in the formulation, onium salts such as quaternary alkylammonium salts, and mixtures thereof. A wide variety of primary, secondary, tertiary, quaternary and zwitterionic alkylamine and alkylammonium salt surfactants can be utilized in the preparation of the herbicidal compositions described herein. A subclass of primary, secondary, and tertiary alkylamine surfactants for use in the present compositions are alkyl amine oxides, alkyletheramines, and alkyletheramine oxides as disclosed in U.S. Pat. No. 5,750,468 (to Wright).

In aqueous concentrate and RTU compositions of the present invention, a concentration ratio of the glyphosate in grams acid equivalent ("g a.e./L") to the surfactant component in g/L of from about 1:1 to about 50:1 is preferred, more preferably from about 2:1 to about 20:1, more preferably from about 2:1 to about 10:1, more preferably from about 3:1 to about 10:1, and most preferably from about 3:1 to about 5:1, such as about 4:1. In aqueous concentrates of the present invention, total surfactant loadings of about 120 g/L to about 150 g/L, such as about 135 g/L, can be attained in compositions containing glyphosate salt loadings of about 480 g a.e./L to about 600 g a.e./L, such as about 540 g/L. The weight ratio of glyphosate to surfactant component is important from the standpoints of enhanced bioefficacy, compatibility, and long term storage stability.

In solid concentrate compositions of the present invention, a weight ratio of glyphosate in grams acid equivalent ("g a.e.") to the total surfactant component in grams may generally vary from about 1:1 to about 50:1, preferably from about 2:1 to about 20:1, more preferably from about 2:1 to about 10:1, more preferably from about 3:1 to about 10:1, and most preferably from about 3:1 to about 5:1, such as about 4:1.

The compositions may comprise one or more foam-moderating agents. Suitable foam-moderating agents include silicone-based compositions. An example of a foam-moderating agent for compositions is SAG-10, available from GE Silicones Corporation (Wilton, Conn.). The amount of foam-moderating agent optionally employed is that which is sufficient to inhibit and/or reduce an amount of foam that may otherwise be formed during the process of preparing and containerizing the formulation and/or use thereof to a desired and satisfactory level. Generally, the concentration of foam-moderating agent is in the range from about 0.001% up to about 0.05% by weight of the composition, and typically from about 0.01% to about 0.03% by weight of the composition, although greater or lesser amounts may be employed.

The compositions may also comprise a preservative such as PROXEL GXL containing 1,2-benzisothiazolin-3-one (CAS No. 2634-33-5) available from Avecia, Inc. (Wilmington, Del.), DOWICIL 150 containing cis-1-(3-chloroallyl)-3,5,7-triaza-1-azoniaadmatane chloride (CAS No. 051229-78-8) available from Dow Chemical Company (Midland, Mich.), NIPACIDE BIT20DPG containing benzisothiazolinone available from Clariant Corporation (Greensboro, N.C.), LEGEND MK anti-microbial biocide available from Rohm and Haas Co. (Philadelphia, Pa.), sorbic acid, mixtures thereof and the like in the range of from about 0.01% to about 0.2% by weight, preferably about 0.1% by weight of the composition.

Suitable antifreeze agents include ethylene glycol and propylene glycol and generally may be present at a concentration of from about 0.1% to about 10% by weight of the RTU composition. Antifreeze agents assist in lowering the freezing point of aqueous solutions and maintaining solubility of the components of the composition such that components do not crystallize or precipitate during cycles of freezing and thawing.

Although the compositions of the present invention generally show good overall stability and viscosity properties without the addition of any further additives, the addition of a solubility-enhancing agent (also commonly referred to as a cloud point enhancer or stabilizer) may significantly improve the properties of the formulations. Solubility-enhancing agents include polymer derivatives of ethylene glycol and propylene glycol (e.g., 200-1200 average molecular weight), glycerol, sugars, mixtures thereof and the like in amounts up to about 10%, preferably from about 0.05 to about 10% by weight, more preferably from about 0.1 to about 1% by weight of the RTU composition.

The herbicidal compositions, i.e., liquid concentrates, solid concentrates, and ready to use formulations may further comprise a co-herbicide. The amidoalkylamine surfactant enhances the solubility of tank-mixed herbicidal compositions that further comprise a co-herbicide. In some preferred embodiments, the herbicidal composition is a tank mixed ready to use formulation further comprising a co-herbicide, said tank mixed ready to use formulation being more stable, i.e., characterized by reduced agglomeration or precipitation of the co-herbicide, than conventional glyphosate formulations.

In some embodiments, water-soluble co-herbicides can be included in the compositions of the present invention. Water-soluble co-herbicides include acifluorfen, acrolein, amitrole, asulam, benazolin, bentazon, bialaphos, bromacil, bromoxynil, chloramben, chloroacetic acid, clopyralid, 2,4-D, 2,4-DB, dalapon, dicamba, dichlorprop, difenzoquat, diquat, endothall, fenac, fenoxaprop, flamprop, flumiclorac, fluoroglycofen, flupropanate, fomesafen, fosamine, glufosinate, imazameth, imazamethabenz, imazamox, imazapic, imazapyr, imazaquin, imazethapyr, ioxynil, MCPA, MCPB, mecoprop, methylarsonic acid, naptalam, nonanoic acid, paraquat, picloram, quinclorac, sulfamic acid, 2,3,6-TBA, TCA, triclopyr and water-soluble salts thereof.

In some embodiments, co-herbicides that are not readily water-soluble can be coupled into the aqueous herbicidal composition by inclusion of a sufficient quantity of an appropriate surfactant. In addition, the compositions of the present invention may include finely-divided, water-insoluble herbicides. Examples of herbicides having limited water solubility include, for example, acetochlor, aclonifen, alachlor, ametryn, amidosulfuron, anilofos, atrazine, azafenidin, azimsulfuron, benfluralin, benfuresate, bensulfuron-methyl, bensulide, benzofenap, bifenox, bromobutide, bromofenoxim, butachlor, butamifos, butralin, butroxydim, butylate, cafenstrole, carbetamide, carfentrazone-ethyl, chlomethoxyfen, chlorbromuron, chloridazon, chlorimuron-ethyl, chlomitrofen, chlorotoluron, chlorpropham, chlorsulfuron, chlorthal-dimethyl, chlorthiamid, cinmethylin, cinosulfuron, clethodim, clodinafop-propargyl, clomazone, clomeprop, cloransulam-methyl, cyanazine, cycloate, cyclosulfamuron, cycloxydim, cyhalofop-butyl, daimuron, desmedipham, desmetryn, dichlobenil, diclofop-methyl, diflufenican, dimefuron, dimepiperate, dimethachlor, dimethametryn, dimethenamid, dinitramine, dinoterb, diphenamid, dithiopyr, diuron, EPTC, esprocarb, ethalfluralin, ethametsulfuron-methyl, ethofumesate, ethoxysulfuron, etobenzanid, fenoxaprop-ethyl, fenuron, flamprop-methyl, flazasulfuron, fluazifop-butyl, fluchloralin, flumetsulam, flumiclorac-pentyl, flumioxazin, fluometuron, fluorochloridone, fluoroglycofen-ethyl, flupoxam, flurenol, fluridone, fluroxypyr-1-methylheptyl, flurtamone, fluthiacet-methyl, fomesafen, halosulfuron, haloxyfop-methyl, hexazinone, imazamox, imazosulfuron, indanofan, isoproturon, isouron, isoxaben, isoxaflutole, isoxapyrifop, lactofen, lenacil, linuron, mefenacet, mesotrione, metamitron, metazachlor, methabenzthiazuron, methyldymron, metobenzuron, metobromuron, metolachlor, metosulam, metoxuron, metribuzin, metsulfuron, molinate, monolinuron, naproanilide, napropamide, naptalam, neburon, nicosulfuron, norflurazon, orbencarb, oryzalin, oxadiargyl, oxadiazon, oxasulfuron, oxyfluorfen, pebulate, pendimethalin, pentanochlor, pentoxazone, phenmedipham, piperophos, pretilachlor, primisulfuron, prodiamine, prometon, prometryn, propachlor, propanil, propaquizafop, propazine, propham, propisochlor, propyzamide, prosulfocarb, prosulfuron, pyraflufen-ethyl, pyrazolynate, pyrazosulfuron-ethyl, pyrazoxyfen, pyributicarb, pyridate, pyriminobac-methyl, quinclorac, quinmerac, quizalofop-ethyl, rimsulfuron, sethoxydim, siduron, simazine, simetryn, sulcotrione, sulfentrazone, sulfometuron, sulfosulfuron, tebutam, tebuthiuron, terbacil, terbumeton, terbuthylazine, terbutryn, thenylchlor, thiazopyr, thifensulfuron, thiobencarb, tiocarbazil, tralkoxydim, triallate, triasulfuron, tribenuron, trietazine, trifluralin, triflusulfuron, and vemolate. Additional herbicidal active ingredient(s) in a concentrate or RTU formulation are present in an agriculturally useful concentration that will vary depending on the particular additional herbicide(s) selected for inclusion and is readily determined by those skilled in the art.

The herbicidal concentrate of the present invention may be prepared by combining the required amounts of glyphosate, water, amidoalkylamine surfactant coupling agent, and the co-surfactant, with mixing using a mechanical stirrer or any other suitable container or device producing the necessary amount of agitation or circulation to thoroughly mix the ingredients. The order of addition of the starting materials is not narrowly critical to the stability of the final concentrate. In various embodiments, the herbicidal concentrate is prepared according to an order of component addition. Herein, water is preferably added to the mixing vessel first, followed by the addition of the glyphosate salt. Next, the amidoalkylamine surfactant coupling agent is added, followed by the addition of the co-surfactant. In some embodiments, the co-surfactant may be added as a preblended mixture with the amidoalkylamine surfactant. In other embodiments, the co-surfactants may be added singly, either before or after addition of the amidoalkylamine surfactant.

A solid concentrate of the present invention may also be prepared by combining the required amounts of glyphosate, amidoalkylamine surfactant coupling agent, the co-surfactant, with mixing using a mechanical stirrer, ball milling, or any other suitable container or device producing the necessary amount of agitation or circulation to thoroughly mix the ingredients. The order of addition of the materials to prepare the solid concentrate is not narrowly critical to the stability of the final concentrate.

The RTU compositions of the present invention can be prepared by diluting an aqueous herbicidal concentrate or dissolving a solid concentrate with an appropriate amount of water.

The present invention is also directed to a method for killing or controlling weeds or other unwanted plants by spraying or otherwise applying a herbicidally effective amount of the RTU or diluted concentrate formulations described herein to the foliage of the plants to be treated. The herbicidal spray compositions included in the present invention can be applied to the foliage of the plants to be treated through any of the appropriate methods that are well known to those having skill in the art. In some embodiments, the RTU composition is packaged in a portable container suitable for hand carry by the user and fitted with an apparatus for manually releasing the composition from the container onto the foliage of the plants to be treated in the form of a spray.

The compositions of the present invention can be used to kill or control the growth of a wide variety of plants. Particularly important annual dicotyledonous plant species include, without limitation, velvetleaf (*Abutilon theophrasti*), pigweed (*Amaranthus* spp.), buttonweed (*Borreria* spp.), oilseed rape, canola, indian mustard, etc. (*Brassica* spp.), commelina (*Commelina* spp.), filaree (*Erodium* spp.), sunflower (*Helianthus* spp.), morningglory (*Ipomoea* spp.), kochia (*Kochia scoparia*), mallow (*Malva* spp.), wild buckwheat, smartweed, etc. (*Polygonum* spp.), purslane (*Portulaca* spp.), Russian thistle (*Salsola* spp.), sida (*Sida* spp.), wild mustard (*Sinapis arvensis*) and cocklebur (*Xanthium* spp.).

Particularly important annual monocotyledonous plant species that may be killed or controlled using the compositions of the present invention include, without limitation, wild oat (*Avena fatua*), carpetgrass (*Axonopus* spp.), downy brome (*Bromus tectorum*), crabgrass (*Digitaria* spp.), barnyardgrass (*Echinochloa crus-galli*), goosegrass (*Eleusine indica*), annual ryegrass (*Lolium multiflorum*), rice (*Oryza sativa*), ottochloa (*Ottochloa nodosa*), bahiagrass (*Paspalum notatum*), canarygrass (*Phalaris* spp.), foxtail (*Setaria* spp.), wheat (*Triticum aestivum*) and corn (*Zea mays*).

Particularly important perennial dicotyledonous plant species for control of which a composition of the invention can be used include, without limitation, mugwort (*Artemisia* spp.), milkweed (*Asclepias* spp.), Canada thistle (*Cirsium arvense*), field bindweed (*Convolvulus arvensis*) and kudzu (*Pueraria* spp.).

Particularly important perennial monocotyledonous plant species for control of which a composition of the invention can be used include, without limitation, brachiaria (*Brachiaria* spp.), bermudagrass (*Cynodon dactylon*), quackgrass (*Elymus repens*), lalang (*Imperata cylindrica*), perennial ryegrass (*Lolium perenne*), guineagrass (*Panicum maximum*), dallisgrass (*Paspalum dilatatum*), reed (*Phragmites* spp.), johnsongrass (*Sorghum halepense*) and cattail (*Typha* spp.).

Other particularly important perennial plant species for control of which a composition of the invention can be used include, without limitation, horsetail (*Equisetum* spp.), bracken (*Pteridium aquilinum*), blackberry (*Rubus* spp.) and gorse (*Ulex europaeus*).

Suitable herbicidally efficacious application or spray rates used in the practice of the present invention will vary depending on the particular composition and concentration of active ingredients, the desired effects, plant species treated, weather and other factors. What constitutes a "desired effect" varies according to the standards and practice of those who investigate, develop, market and use compositions and the selection of application rates that are herbicidally effective for a composition of the invention is within the skill of those skilled in the art.

Definitions

The term "hydrocarbyl" as used herein describes organic compounds or radicals consisting exclusively of the elements carbon and hydrogen. These moieties include alkyl, alkenyl, alkynyl, and aryl moieties. These moieties also include alkyl, alkenyl, alkynyl, and aryl moieties substituted with other aliphatic or cyclic hydrocarbon groups, such as alkaryl, alkenaryl and alkynaryl. Unless otherwise indicated, these moieties preferably comprise 1 to 30 carbon atoms.

The term "hydrocarbylene" as used herein describes radicals joined at two ends thereof to other radicals in an organic compound, and which consist exclusively of the elements carbon and hydrogen. These moieties include alkylene, alkenylene, alkynylene, and arylene moieties. These moieties also include alkyl, alkenyl, alkynyl, and aryl moieties substituted with other aliphatic or cyclic hydrocarbon groups, such as alkaryl, alkenaryl and alkynaryl. Unless otherwise indicated, these moieties preferably comprise 1 to 30 carbon atoms.

The term "substituted hydrocarbyl" as used herein describes hydrocarbyl moieties that are substituted with at least one atom other than carbon, including moieties in which a carbon chain atom is substituted with a hetero atom such as nitrogen, oxygen, silicon, phosphorous, boron, sulfur, or a halogen atom. These substituents include halogen, heterocyclo, alkoxy, alkenoxy, alkynoxy, aryloxy, hydroxy, protected hydroxy, ketal, acyl, acyloxy, nitro, amino, amido, cyano, thiol, acetal, sulfoxide, ester, thioester, ether, thioether, hydroxyalkyl, urea, guanidine, amidine, phosphate, amine oxide, and quaternary ammonium salt.

The "substituted hydrocarbylene" moieties described herein are hydrocarbylene moieties which are substituted with at least one atom other than carbon, including moieties in which a carbon chain atom is substituted with a hetero atom such as nitrogen, oxygen, silicon, phosphorous, boron, sulfur, or a halogen atom. These substituents include halogen, heterocyclo, alkoxy, alkenoxy, alkynoxy, aryloxy, hydroxy, protected hydroxy, ketal, acyl, acyloxy, nitro, amino, amido, cyano, thiol, acetal, sulfoxide, ester, thioester, ether, thioether, hydroxyalkyl, urea, guanidine, amidine, phosphate, amine oxide, and quaternary ammonium salt.

Unless otherwise indicated, the alkyl groups described herein are preferably lower alkyl containing from one to 18 carbon atoms in the principal chain and up to 30 carbon atoms. They may be straight or branched chain or cyclic and include methyl, ethyl, propyl, isopropyl, n-butyl, isobutyl, hexyl, 2-ethylhexyl, and the like.

Unless otherwise indicated, the alkenyl groups described herein are preferably lower alkenyl containing from two to 18 carbon atoms in the principal chain and up to 30 carbon atoms. They may be straight or branched chain or cyclic and include ethenyl, propenyl, isopropenyl, butenyl, isobutenyl, hexenyl, and the like. Unless otherwise indicated, the alkynyl groups described herein are preferably lower alkynyl containing from two to 18 carbon atoms in the principal chain and up to 30 carbon atoms. They may be straight or branched chain and include ethynyl, propynyl, butynyl, isobutynyl, hexynyl, and the like. The term "aryl" as used herein alone or as part of another group denote optionally substituted homocyclic aromatic groups, preferably monocyclic or bicyclic groups containing from 6 to 12 carbons in the ring portion, such as phenyl, biphenyl, naphthyl, substituted phenyl, substituted biphenyl or substituted naphthyl. Phenyl and substituted phenyl are the more preferred aryl.

As used herein, the alkyl, alkenyl, alkynyl and aryl groups can be substituted with at least one atom other than carbon, including moieties in which a carbon chain atom is substituted with a hetero atom such as nitrogen, oxygen, silicon, phosphorous, boron, sulfur, or a halogen atom. These substituents include hydroxy, nitro, amino, amido, nitro, cyano, sulfoxide, thiol, thioester, thioether, ester and ether, or any other substituent which can increase the compatibility of the surfactant and/or its efficacy enhancement in the potassium glyphosate formulation without adversely affecting the storage stability of the formulation.

The terms "halogen" or "halo" as used herein alone or as part of another group refer to chlorine, bromine, fluorine, and iodine. Fluorine substituents are often preferred in surfactant compounds.

Unless otherwise indicated, the term "hydroxyalkyl" includes alkyl groups substituted with at least one hydroxy group, e.g., bis(hydroxyalkyl)alkyl, tris(hydroxyalkyl)alkyl and poly(hydroxyalkyl)alkyl groups. Preferred hydroxyalkyl groups include hydroxymethyl (—CH$_2$OH), and hydroxyethyl (—C$_2$H$_4$OH), bis(hydroxy-methyl)methyl (—CH(CH$_2$OH)$_2$), and tris(hydroxymethyl)methyl (—C(CH$_2$OH)$_3$).

The term "cyclic" as used herein alone or as part of another group denotes a group having at least one closed ring, and includes alicyclic, aromatic (arene) and heterocyclic groups.

The terms "heterocyclo" or "heterocyclic" as used herein alone or as part of another group denote optionally substituted, fully saturated or unsaturated, monocyclic or bicyclic, aromatic or nonaromatic groups having at least one heteroatom in at least one ring, and preferably 5 or 6 atoms in each ring. The heterocyclo group preferably has 1 or 2 oxygen atoms, 1 or 2 sulfur atoms, and/or 1 to 4 nitrogen atoms in the ring, and may be bonded to the remainder of the molecule through a carbon or heteroatom. Exemplary heterocyclo include heteroaromatics such as furyl, thienyl, pyridyl, oxazolyl, pyrrolyl, indolyl, quinolinyl, or isoquinolinyl and the like, and non-aromatic heterocyclics such as tetrahydrofuryl, tetrahydrothienyl, piperidinyl, pyrrolidino, etc. Exemplary substituents include one or more of the following groups: hydrocarbyl, substituted hydrocarbyl, keto, hydroxy, protected hydroxy, acyl, acyloxy, alkoxy, alkenoxy, alkynoxy, aryloxy, halogen, amido, amino, nitro, cyano, thiol, thioester, thioether, ketal, acetal, ester and ether.

The term "heteroaromatic" as used herein alone or as part of another group denote optionally substituted aromatic groups having at least one heteroatom in at least one ring, and preferably 5 or 6 atoms in each ring. The heteroaromatic group preferably has 1 or 2 oxygen atoms, 1 or 2 sulfur atoms, and/or 1 to 4 nitrogen atoms in the ring, and may be bonded to the remainder of the molecule through a carbon or heteroatom. Exemplary heteroaromatics include furyl, thienyl, pyridyl, oxazolyl, pyrrolyl, indolyl, quinolinyl, or isoquinolinyl and the like. Exemplary substituents include one or more of the following groups: hydrocarbyl, substituted hydrocarbyl, keto, hydroxy, protected hydroxy, acyl, acyloxy, alkoxy, alkenoxy, alkynoxy, aryloxy, halogen, amido, amino, nitro, cyano, thiol, thioether, thioether, ketal, acetal, ester and ether.

The term "acyl," as used herein alone or as part of another group, denotes the moiety formed by removal of the hydroxyl group from the group —COOH of an organic carboxylic acid, e.g., RC(O)—, wherein R is R$^1$, R$^1$O—, R$^1$R$^2$N—, or R'S—, R$^1$ is hydrocarbyl, heterosubstituted hydrocarbyl, or heterocyclo and R$^2$ is hydrogen, hydrocarbyl or substituted hydrocarbyl.

The term "acyloxy," as used herein alone or as part of another group, denotes an acyl group as described above bonded through an oxygen linkage (—O—), e.g., RC(O)O— wherein R is as defined in connection with the term "acyl."

When a maximum or minimum "average number" is recited herein with reference to a structural feature such as oxyethylene units, it will be understood by those skilled in the art that the integer number of such units in individual molecules in a surfactant preparation typically varies over a range that can include integer numbers greater than the maximum or smaller than the minimum "average number". The presence in a composition of individual surfactant molecules having an integer number of such units outside the stated range in "average number" does not remove the composition from the scope of the present invention, so long as the "average number" is within the stated range and other requirements are met.

Herbicidal effectiveness is one of the biological effects that can be enhanced through this invention. "Herbicidal effectiveness," as used herein, refers to any observable measure of control of plant growth, which can include one or more of the actions of (1) killing, (2) inhibiting growth, reproduction or proliferation, and (3) removing, destroying, or otherwise diminishing the occurrence and activity of plants.

Having described the invention in detail, it will be apparent that modifications and variations are possible without departing from the scope of the invention defined in the appended claims.

EXAMPLES

The following non-limiting examples are provided to further illustrate the present invention.

Example 1: Formulation Preparation

Compositions comprising either potassium glyphosate or a mixture of potassium and isopropylammonium glyphosate were prepared and subjected to various tests as described in the following Examples.

Various surfactants, co-surfactants, and other excipients were used in the compositions of the examples. These compounds are identified in the table below.

| | SURFACTANTS | |
|---|---|---|
| A | ARMEEN APA-9 | Amidopropylamine surfactant with a C$_5$-C$_9$ hydrophobe |
| B | Alkoxylated Tertiary Amine Oxide | Compound of formula (2a) wherein R$^{21}$ is coco, R$^{25}$ is ethylene, R$^{26}$ is propylene, the sum of x and y is about 9, and the sum of p and q is about 2 |
| C | ACAR 10133 A | Oleic (10EO) DETA amidoamine |
| D | ACAR 8080 | Alkoxylated betaine |
| E | WITCAMINE 210 18EO | TOFA (18EO) DETA amidoamine |
| F | ACAR 10133 B | Oleic (18EO) DETA amidoamine |
| G | ACAR 14017 | Castor oil amidopropylamine (10 EO) betaine |

-continued

| | | SURFACTANTS |
|---|---|---|
| H | ACAR 14017 | Castor oil amidopropylamine (15 EO) betaine |
| I | ACAR 14001 | Tallow DETA 5EO |
| J | ACAR 14001 | Tallow DETA 8EO |
| K | ACAR 14001 | Tallow DETA 10EO |
| L | ACAR 14001 | Tallow DETA 15EO |
| M | ACAR 13045 | Low Erucic Rape seed DETA 5EO |
| N | ACAR 13045 | Low Erucic Rape seed DETA 8EO |
| O | ACAR 13045 | Low Erucic Rape seed DETA 10EO |
| P | ACAR 13045 | Low Erucic Rape seed DETA 15EO |
| Q | ACAR 13046 | Palm oil DETA 8EO |
| R | ACAR 13046 | Palm oil DETA 5EO |
| S | ACAR 13046 | Palm oil DETA 10EO |
| T | ACAR 13046 | Palm oil DETA 15EO |
| U | ACAR 13047 | Oleic DETA 5EO |
| V | ACAR 13047 | Oleic DETA 8EO |
| W | ACAR 13047 | Oleic DETA 10EO |
| X | ACAR 13047 | Oleic DETA 15EO |
| Y | ACAR 13029 | Soy DETA 5EO |
| Z | ACAR 13029 | Soy DETA 8EO |
| AA | ACAR 13029 | Soy DETA 10EO |
| BB | ACAR 13029 | Soy DETA 15EO |
| CC | ACAR 13029 | Soy DETA 18EO |
| DD | ACAR 14049 | Soy DETA 10EO, 2 PO |
| EE | Intermediate 210 13 EO | Tall oil DETA 13EO |
| FF | Intermediate 210 18 EO | Tall oil DETA 18EO |
| GG | ACAR 10133B | Oleic DETA 18EO |
| HH | ACAR 10055 | Tallow DETA EO |

Compositions comprising the potassium salt of glyphosate are described in Table 1A below. Compositions comprising a 70:30 weight/weight mixture (on a glyphosate acid equivalent basis) of the potassium and isopropylammonium salts of glyphosate are described in Table 1B below.

TABLE 1A

Potassium Glyphosate Formulations

| FORMULATION | Gly % (a.e.) | Co-surf | Co-surf wt % | Amido-alkyl-amine | Amido-alkylamine wt % |
|---|---|---|---|---|---|
| GC10001 | 46 | B | 4.98 | A | 4.97 |
| GC10002 | 46 | C | 4.98 | A | 4.97 |
| GC10003 | 46 | D | 7.46 | A | 2.49 |

TABLE 1B

Potassium/IPA (70/30) Glyphosate Formulations

| FORMULATION | Gly % (a.e.) | Co-surf | Co-surf wt % | Amido-alkyl-amine | Amido-alkylamine wt % |
|---|---|---|---|---|---|
| GC10004 | 47 | E | 8.52 | A | 1.70 |
| GC10005 | 47 | F | 8.52 | A | 1.70 |

Example 2: Formulation Stability Testing for Glyphosate Formulations

Glyphosate formulations were tested for cloud point using the following procedure. The test formulation was poured into a 25 mm×200 mm PYREX test tube to a level of approximately 2 inches from the bottom. The test sample was heated until cloudy using a hot water bath. Temperature as monitored using an alcohol thermometer. Once the previously clear formulation became cloudy, or the temperature reached 85° C., the test sample was removed from the water bath. If the formulation remained clear throughout the test, the cloud point was recorded as >85° C. If cloudy, the formulation was stirred with the alcohol thermometer until it became clear. The temperature at which the test sample became clear was recorded as the formulation cloud point.

The cloud point results are provided in Table 2 below. Each test composition contained 540 g a.e./L of glyphosate and 135 g/L total surfactant.

TABLE 2

Formulation Stability

| FORMULATION | Glyphosate g a.e./L | Total Surf. (g/L) | Cloud Point (° C.) |
|---|---|---|---|
| GC10001 | 540 | 135 | >85 |
| GC10002 | 540 | 135 | N/M |
| GC10003 | 540 | 135 | 74 |
| GC10004 | 540 | 135 | 56 |
| GC10005 | 540 | 135 | N/M |

N/M = not measured

Example 3: Weed Control Evaluations

The herbicidal effectiveness data set forth herein report "control" as a percentage following a standard procedure in the art which reflects a visual assessment of plant mortality and growth reduction by comparison with untreated plants, made by technicians specially trained to make and record such observations. In all cases, a single technician makes all assessments of percent control within any one experiment or trial. Such measurements are relied upon and regularly reported by Monsanto Company in the course of its herbicide business.

Percent control of individual weed species was visually evaluated 19-22 days after application. Treatment compositions are described in Tables 1A and 1B, above. Treatments were applied when weeds were 6-8 inches tall. Each formulation was applied at 560 g ae/ha, 840 g ae/ha and 1260 g ae/ha. Rates were calculated on a glyphosate acid equivalent (a.e.) basis to ensure the same amount of glyphosate acid was applied regardless of the type of glyphosate salt in the formulation. A ROUNDUP POWERMAX standard was included in each trial.

Weed efficacy of individual formulations (averaged across 3 application rates) against palmer amaranth (AMASS), common purslane (POROL), and hemp sesbania (SEBEX) is provided in Table 3A below.

TABLE 3A

Weed Efficacy

| FORMULATION | AMASS | POROL | SEBEX |
|---|---|---|---|
| ROUNDUP POWERMAX | 83.2 | 94.0 | 66.0 |
| GC10001 | 91.8 | 93.5 | 71.5 |
| GC10002 | 89.7 | 94.7 | 70.0 |
| GC10003 | 95.0 | 97.5 | 76.4 |
| GC10004 | 88.8 | 88.8 | 63.2 |
| GC10005 | 88.6 | 91.2 | 66.0 |

Weed efficacy of individual formulations (averaged across 3 application rates) against velvetleaf (ABUTH), ivyleaf momningglory (IPOSS), and hemp sesbania (SEBEX) is provided in Table 3B below.

TABLE 3B

| FORMULATION | Weed Efficacy | | |
|---|---|---|---|
| | ABUTH | IPOSS | SEBEX |
| ROUNDUP POWERMAX | 85.7 | 75.1 | 62.8 |
| GC10001 | 90.6 | 78.4 | 64.4 |
| GC10002 | 95.2 | 83.4 | 52.9 |
| GC10003 | 86.6 | 77.7 | 59.4 |
| GC10004 | 92.2 | 80.9 | 54.5 |
| GC10005 | 94.6 | 81.6 | 54.2 |

Weed efficacy of individual formulations (averaged across 3 application rates) against ivyleaf momningglory (IPOSS), and tall waterhemp (AMATU) is provided in Table 3C below.

TABLE 3C

| FORMULATION | Weed Efficacy | |
|---|---|---|
| | IPOSS | AMATU |
| ROUNDUP POWERMAX | 86.5 | 93.1 |
| GC10001 | 87.9 | 93.9 |
| GC10002 | 92.0 | 93.8 |
| GC10003 | 85.6 | 89.2 |
| GC10004 | 90.6 | 94.5 |
| GC10005 | 90.5 | 91.5 |

Weed efficacy of individual formulations (averaged across 3 application rates) against foxtail (ALOSS), ivyleaf momningglory (IPOHE), velvetleaf (ABUTH), and tall waterhemp (AMATA) in ROUNDUP READY corn is provided in Table 3D below.

TABLE 3D

| FORMULATION | Weed Efficacy | | | |
|---|---|---|---|---|
| | ALOSS | IPOHE | ABUTH | AMATA |
| ROUNDUP POWERMAX | 99.8 | 100 | 100 | 100 |
| GC10001 | 99.6 | 100 | 99.0 | 100 |
| GC10002 | 98.1 | 98.8 | 96.9 | 100 |
| GC10003 | 99.2 | 99.6 | 99.0 | 100 |
| GC10004 | 98.1 | 100 | 97.8 | 100 |
| GC10005 | 99.4 | 100 | 98.1 | 100 |

Weed efficacy of individual formulations (averaged across 3 application rates) against tall waterhemp (AMATA), velvetleaf (ABUTH), common cocklebur (XANST), giant foxtail (SETFA), and in ROUNDUP READY soybean is provided in Table 3E below.

TABLE 3E

| FORMULATION | Weed Efficacy | | | |
|---|---|---|---|---|
| | AMATA | ABUTH | XANST | SETFA |
| ROUNDUP POWERMAX | 98.5 | 78.1 | 100.0 | 99.9 |
| GC10001 | 99.0 | 76.1 | 99.9 | 95.0 |
| GC10002 | 99.5 | 80.2 | 100.0 | 98.9 |
| GC10003 | 98.8 | 83.1 | 100.0 | 99.2 |
| GC10004 | 99.3 | 82.0 | 100.0 | 99.6 |
| GC10005 | 99.7 | 83.5 | 100.0 | 98.4 |

Example 4: Bioassays of Aquatic Organisms

Aquatic toxicity studies were performed utilizing two species of aquatic organisms *Pseudokirchneriella subcapitata*, a species of algae, and *Daphnia magna*, a crustacean.

These studies were performed to identify glyphosate formulations, described in Example 1 above, that have low toxicity to aquatic organisms. The results of these assays are provided in Table 4 below.

TABLE 4

| | Bioassays of aquatic organisms | |
|---|---|---|
| FORMULATION | Daphnia $EC_{50}$ (mg/L) | P. subcapitata $EC_{50}$ (mg/L) |
| GC10001 | 143.5 | 38 |
| GC10002 | 100 | 5.8 |
| GC10003 | 31.6 | 2.1 |
| GC10004 | 31.6 | 6.7 |
| GC10005 | 158.1 | 8.4 |

Example 5: Aquatic Study Using Castor Oil Surfactants

A composition comprising the potassium salt of glyphosate and a castor oil betaine surfactant was prepared as described in Table 5A below.

TABLE 5A

| | Potassium Glyphosate Formulations | | | | |
|---|---|---|---|---|---|
| FORMU-LATION | Gly % (a.e.) | Co-surf | Co-surf wt % | Amido-alkylamine | Amidoalkylamine wt % |
| GC10006 | 39.83 | G | 5.20 | A | 5.00 |

An aquatic toxicity study was performed according to the procedures used in Example 4 above. The results of this assay are provided in Table 5B below.

TABLE 5B

| | Aquatic Toxicity Data | | | |
|---|---|---|---|---|
| Formulation | Daphnia 48 hr $EC_{50}$ (mg/L) | Algae 72 hr $EC_{50}$ (cell density) | Algae 96 hr $EC_{50}$ (cell density) | NOECs (mg/L) |
| GC10006 | >100 mg/L | 17.9 mg/L | 14.9 mg/L | 1.0 |

Example 6: Weed Control Efficacy

Weed control efficacy of a test formulation (GC10006) and a control formulation (ROUNDUP POWERMAX) against various weeds is provided in Table 6 below. The data represent the average control across 3 application rates evaluated at 21 days after treatment.

TABLE 6

| Average % weed control by species | | |
|---|---|---|
| Weed Species | GC10006 | POWERMAX |
| velvetleaf | 94.7 | 96.3 |
| morningglory | 87.7 | 88.7 |
| Palmer amaranth | 94.0 | 95.3 |

TABLE 6-continued

Average % weed control by species

| Weed Species | GC10006 | POWERMAX |
|---|---|---|
| redroot pigweed* | 100.0 | 100.0 |
| waterhemp* | 100.0 | 100.0 |
| hemo sesbania | 91.0 | 94.0 |
| common purslane | 97.0 | 97.0 |
| venice mallow* | 100.0 | 100.0 |
| prickly side* | 93.3 | 94.3 |
| carbgrass sps. | 96.7 | 96.7 |
| Echinochloa sps. | 97.3 | 98.0 |
| giant foxtail | 99.0 | 99.3 |
| green foxtail | 97.7 | 98.7 |
| sorghum* | 99.7 | 100.0 |
| pear millet* | 100.0 | 100.0 |

Example 7: Formulation Stability Testing

Glyphosate formulations were tested for cloud point using the procedure described in Example 2 above. The color of each formulation was also evaluated using the Gardner color scale. The results of these assays are provided in Table 7 below.

Each test formulation contained 540 g a.e./L of potassium glyphosate.

TABLE 7

Formulation Stability and Color

| FORMULATION | Co-surf | Co-surf g/L | Amido-alkylamine | Amido-alkylamine g/L | Gardner color | Cloud Point (° C.) |
|---|---|---|---|---|---|---|
| GC10007 | G | 39 | A | 68 | 3 | >90° C. |
| GC10008 | H | 39 | A | 68 | 3 | >90° C. |
| GC10009 | H | 43 | A | 68 | 4 | >90° C. |
| GC10010 | H | 47 | A | 68 | 4 | >90° C. |
| GC10011 | G | 41 | A | 68 | 3 | >90° C. |
| GC10012 | G | 44 | A | 68 | 3-4 | >90° C. |

Example 8: Formulation Stability Testing

Compositions comprising the potassium salt of glyphosate as described in Table 8A below were prepared. Each test formulation contained 540 g a.e./L of potassium glyphosate.

TABLE 8A

Potassium Glyphosate Formulations

| FORMULATION | Co-surf | Co-surf wt % | Amido-alkylamine | Amido-alkylamine wt % | Density (g/mL) |
|---|---|---|---|---|---|
| GC10013 | I | 5 | A | 5 | 1.3608 |
| GC10014 | J | 5 | A | 5 | 1.3598 |
| GC10015 | K | 5 | A | 5 | 1.3611 |
| GC10016 | L | 5 | A | 5 | 1.3651 |
| GC10017 | M | 5 | A | 5 | 1.3543 |
| GC10018 | N | 5 | A | 5 | 1.3555 |
| GC10019 | O | 5 | A | 5 | 1.3574 |
| GC10020 | P | 5 | A | 5 | 1.3592 |
| GC10021 | Q | 5 | A | 5 | N/M |
| GC10022 | R | 5 | A | 5 | N/M |
| GC10023 | S | 5 | A | 5 | N/M |
| GC10024 | T | 5 | A | 5 | 1.3632 |
| GC10025 | U | 5 | A | 5 | 1.3545 |
| GC10026 | V | 5 | A | 5 | 1.3579 |
| GC10027 | W | 5 | A | 5 | 1.3579 |
| GC10028 | X | 5 | A | 5 | 1.3597 |
| GC10029 | Y | 5 | A | 5 | 1.3551 |
| GC10030 | Z | 5 | A | 5 | 1.3611 |
| GC10031 | AA | 5 | A | 5 | 1.3641 |
| GC10032 | BB | 5 | A | 5 | 1.3633 |
| GC10033 | CC | 5 | A | 5 | 1.3625 |
| GC10034 | DD | 5 | A | 5 | 1.3580 |
| GC10035 | DD | 4.05 | A | 4.05 | 1.3584 |
| GC10036 | EE | 5 | A | 5 | 1.3646 |
| GC10037 | FF | 4 | A | 6 | 1.3579 |
| GC10038 | FF | 5 | A | 5 | 1.3625 |

N/M = not measured

The glyphosate formulations described in Table 8A were tested for cloud point using the procedure described in Example 2 above. The appearance of the formulations was also observed at room temperature (RT) and at a temperature of −20° C. The results of these assays are provided in Table 8B below.

TABLE 8B

Formulation Stability

| FORMULATION | Cloud Point (° C.) | Appearance (RT) | Appearance (−20° C.) |
|---|---|---|---|
| GC10013 | >90 | 2 layers | Not frozen, but 2 layers |
| GC10014 | >90 | 2 layers | Not frozen, but 2 layers |
| GC10015 | >90 | 2 layers | Not frozen, but 2 layers |
| GC10016 | >90 | 2 layers | Not frozen, but 2 layers |
| GC10017 | >90 | OK | Not frozen; uniform |
| GC10018 | >90 | OK | Not frozen; uniform |
| GC10019 | >90 | OK | Not frozen; uniform |
| GC10020 | >90 | OK | Not frozen; uniform |
| GC10021 | 2 phase | N/M | N/M |
| GC10022 | 2 phase | N/M | N/M |
| GC10023 | 2 phase | N/M | N/M |
| GC10024 | >85 | OK | Not frozen, but separated |
| GC10025 | >90 | OK | Not frozen; uniform |
| GC10026 | >90 | OK | Not frozen; uniform |
| GC10027 | >90 | OK | Not frozen; uniform |
| GC10028 | >90 | OK | Not frozen; uniform |
| GC10029 | >90 | OK | Not frozen; uniform |
| GC10030 | >90 | OK | Not frozen; uniform |
| GC10031 | 60 | OK 6 months at RT | N/M |

TABLE 8B-continued

Formulation Stability

| FORMULATION | Cloud Point (° C.) | Appearance (RT) | Appearance (−20° C.) |
|---|---|---|---|
| GC10032 | >90 | 2 layers | Not frozen, but 2 layers |
| GC10033 | >90 | 2 layers | Not frozen, but 2 layers |
| GC10034 | >90 | OK | Not frozen; uniform |
| GC10035 | >90 | OK | Not frozen; uniform |
| GC10036 | >85 | OK | Not frozen; uniform |
| GC10037 | >90 | OK 6 months at RT | N/M |
| GC10038 | >90 | OK 6 months at RT | N/M |

N/M = not measured

Example 9: Weed Control Evaluations

Compositions comprising the potassium salt of glyphosate as described in Table 9A below were prepared. Each test formulation contained 540 g a.e./L of potassium glyphosate.

TABLE 9A

Potassium Glyphosate Formulations

| FORMULATION | Co-surf | Co-surf wt % | Amidoalkylamine | Amidoalkylamine wt % |
|---|---|---|---|---|
| GC10039 | Z | 8.1 | A | 1.60 |
| GC10040 | BB | 4.5 | A | 3.00 |
| GC10041 | AA | 8.1 | A | 2.10 |
| GC10042 | BB | 6.0 | A | 4.00 |
| GC10043 | GG | 5.0 | A | 5.00 |
| GC10044 | FF | 5.0 | A | 5.00 |
| GC10045 | B | 5.0 | A | 5.00 |
| GC10046 | CC | 4.0 | A | 6.00 |
| GC10047 | CC | 5.5 | A | 4.50 |
| GC10048 | FF | 5.5 | A | 4.50 |

Compositions comprising the potassium salt of glyphosate as described in Table 9B below were prepared. Each test formulation contained 570 g a.e./L of potassium glyphosate.

TABLE 9B

Potassium Glyphosate Formulations

| FORMULATION | Co-surf | Co-surf wt % | Amidoalkylamine | Amidoalkylamine wt % |
|---|---|---|---|---|
| GC10049 | DD | 5.0 | A | 5.00 |
| GC10050 | DD | 4.0 | A | 4.00 |

Percent control of individual weed species was visually evaluated 19-21 days after application. Treatments were applied when weeds were 6-8 inches tall. Each formulation was applied at rates of 280 grams a.e./ha, 560 grams a.e./ha, and 840 grams a.e./ha. Rates were calculated on a glyphosate acid equivalent (a.e.) basis to ensure the same amount of glyphosate acid was applied regardless of the type of glyphosate salt in the formulation. A ROUNDUP POWERMAX standard was included in each trial.

Weed efficacy of individual formulations at each application rate against morningglory (IPOHE) and goosegrass (ELEIN) at 21 days after application is provided in Table 9C below.

TABLE 9C

Weed Efficacy

| FORMULATION | Rate (grams a.e./ha) | % CONTROL (ELEIN) | % CONTROL (IPOHE) |
|---|---|---|---|
| ROUNDUP POWERMAX | 280 | 79.2 | 64.2 |
| ROUNDUP POWERMAX | 560 | 95.2 | 83.0 |
| ROUNDUP POWERMAX | 840 | 99.2 | 91.3 |
| GC10045 | 280 | 84.7 | 71.7 |
| GC10045 | 560 | 95.5 | 85.0 |
| GC10045 | 840 | 99.7 | 95.0 |
| GC10039 | 280 | 84.2 | 81.7 |
| GC10039 | 560 | 97.8 | 83.3 |
| GC10039 | 840 | 100.0 | 99.7 |
| GC10040 | 280 | 81.7 | 75.0 |
| GC10040 | 560 | 98.2 | 90.0 |
| GC10040 | 840 | 99.5 | 99.3 |
| GC10041 | 280 | 82.5 | 79.2 |
| GC10041 | 560 | 98.8 | 95.7 |
| GC10041 | 840 | 99.7 | 99.7 |
| GC10032 | 280 | 83.3 | 74.2 |
| GC10032 | 560 | 93.8 | 93.8 |
| GC10032 | 840 | 98.7 | 100.0 |
| GC10042 | 280 | 81.7 | 77.5 |
| GC10042 | 560 | 97.2 | 94.3 |
| GC10042 | 840 | 99.8 | 99.2 |
| GC10033 | 280 | 80.8 | 70.0 |
| GC10033 | 560 | 96.5 | 90.0 |
| GC10033 | 840 | 99.7 | 99.7 |
| GC10043 | 280 | 84.2 | 80.0 |
| GC10043 | 560 | 95.2 | 88.3 |
| GC10043 | 840 | 99.3 | 99.2 |
| GC10044 | 280 | 83.3 | 81.7 |
| GC10044 | 560 | 95.5 | 90.0 |
| GC10044 | 840 | 99.7 | 98.3 |
| GC10038 | 280 | 91.0 | 79.2 |
| GC10038 | 560 | 95.2 | 92.5 |
| GC10038 | 840 | 99.3 | 100.0 |

Weed efficacy of individual formulations at each application rate against velvetleaf (ABUTH) and goosegrass (ELEIN) at 21 days after application is provided in Table 9D below.

TABLE 9D

Weed Efficacy

| FORMULATION | Rate (grams a.e./ha) | % CONTROL (ABUTH) | % CONTROL (ELEIN) |
|---|---|---|---|
| ROUNDUP POWERMAX | 280 | 45.0 | 89.2 |
| ROUNDUP POWERMAX | 560 | 83.8 | 98.7 |
| ROUNDUP POWERMAX | 840 | 93.3 | 98.5 |
| GC10045 | 280 | 30.8 | 91.5 |
| GC10045 | 560 | 78.3 | 98.2 |
| GC10045 | 840 | 85.8 | 98.7 |
| GC10019 | 280 | 55.8 | 72.5 |
| GC10019 | 560 | 76.7 | 97.5 |
| GC10019 | 840 | 87.8 | 98.7 |
| GC10020 | 280 | 54.2 | 70.0 |
| GC10020 | 560 | 79.2 | 97.2 |
| GC10020 | 840 | 90.7 | 98.3 |
| GC10025 | 280 | 45.0 | 57.5 |
| GC10025 | 560 | 79.2 | 95.5 |
| GC10025 | 840 | 87.5 | 98.3 |
| GC10026 | 280 | 62.5 | 67.5 |
| GC10026 | 560 | 78.3 | 97.2 |
| GC10026 | 840 | 93.2 | 97.8 |
| GC10027 | 280 | 42.5 | 74.2 |
| GC10027 | 560 | 81.7 | 97.3 |
| GC10027 | 840 | 94.2 | 98.0 |

TABLE 9D-continued

Weed Efficacy

| FORMULATION | Rate (grams a.e./ha) | % CONTROL (ABUTH) | % CONTROL (ELEIN) |
|---|---|---|---|
| GC10028 | 280 | 57.5 | 70.8 |
| GC10028 | 560 | 85.2 | 96.5 |
| GC10028 | 840 | 94.3 | 98.5 |
| GC10029 | 280 | 55.0 | 73.3 |
| GC10029 | 560 | 78.3 | 96.7 |
| GC10029 | 840 | 93.5 | 99.0 |

Weed efficacy of individual formulations at each application rate against velvetleaf (ABUTH) and goosegrass (ELEIN) at 19 days after application is provided in Table 9E below.

TABLE 9E

Weed Efficacy

| FORMULATION | Rate (grams a.e./ha) | % CONTROL (ABUTH) | % CONTROL (ELEIN) |
|---|---|---|---|
| ROUNDUP POWERMAX | 280 | 79.3 | 93.3 |
| ROUNDUP POWERMAX | 560 | 97.0 | 97.0 |
| ROUNDUP POWERMAX | 840 | 99.0 | 99.5 |
| GC10045 | 280 | 73.8 | 94.5 |
| GC10045 | 560 | 98.8 | 97.5 |
| GC10045 | 840 | 99.8 | 99.5 |
| GC10034 | 280 | 66.3 | 95.3 |
| GC10034 | 560 | 96.0 | 97.8 |
| GC10034 | 840 | 99.5 | 98.3 |
| GC10035 | 280 | 68.8 | 79.8 |
| GC10035 | 560 | 95.3 | 94.5 |
| GC10035 | 840 | 98.5 | 98.5 |
| GC10049 | 280 | 65.0 | 85.5 |
| GC10049 | 560 | 98.0 | 97.0 |
| GC10049 | 840 | 98.8 | 97.3 |
| GC10050 | 280 | 68.8 | 77.3 |
| GC10050 | 560 | 96.5 | 94.3 |
| GC10050 | 840 | 99.0 | 99.8 |
| GC10046 | 280 | 72.5 | 94.3 |
| GC10046 | 560 | 97.5 | 97.5 |
| GC10046 | 840 | 100.0 | 100.0 |
| GC10033 | 280 | 68.8 | 92.8 |
| GC10033 | 560 | 95.8 | 98.3 |
| GC10033 | 840 | 99.8 | 100.0 |
| GC10047 | 280 | 67.5 | 93.5 |
| GC10047 | 560 | 96.5 | 99.3 |
| GC10047 | 840 | 99.5 | 100.0 |
| GC10037 | 280 | 72.5 | 93.8 |
| GC10037 | 560 | 94.3 | 97.8 |
| GC10037 | 840 | 100.0 | 100.0 |
| GC10038 | 280 | 76.3 | 83.3 |
| GC10038 | 560 | 95.3 | 97.8 |
| GC10038 | 840 | 100.0 | 99.8 |
| GC10048 | 280 | 71.3 | 94.8 |
| GC10048 | 560 | 95.5 | 96.5 |
| GC10048 | 840 | 99.0 | 99.5 |

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and processes without departing from the scope of the invention, it is intended that all matter contained in the above description and shown in the accompanying drawings shall be interpreted as illustrative and not in a limiting sense.

What is claimed is:

1. An aqueous herbicidal concentrate composition comprising:
   (a) glyphosate or a derivative thereof;
   (b) an amidoalkylamine surfactant of formula (1):

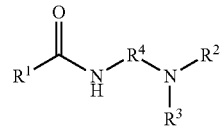

wherein $R^1$ is alkyl or alkenyl having an average of from about 4 carbon atoms to about 22 carbon atoms, $R^2$ and $R^3$ are independently alkyl having from 1 to 4 carbon atoms, and $R^4$ is alkylene having from 1 to 4 carbon atoms; and (c) a co-surfactant component comprising at least one co-surfactant selected from the group consisting of:
   a co-surfactant of formula (3a):

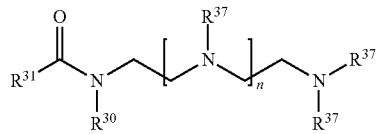

wherein
   $R^{31}$ is a straight or branched chain hydrocarbyl having an average of from about 5 carbon atoms to about 22 carbon atoms;
   $R^{30}$ is selected from hydrogen and $(R^{34}-O)_m R^{35}$;
   each $R^{37}$ is independently selected from hydrogen, $C(O)R^{33}$ and $(R^{34}-O)_m R^{35}$;
   wherein each $R^{33}$ is independently a straight or branched chain $C_{5-22}$ alkyl group; $R^{34}$ in each of the $(R^{34}-O)$ groups is independently selected from $C_{1-4}$ alkylene; and each $R^{35}$ is independently selected from hydrogen and $C_1-C_4$ alkyl;
   each m is an average number such that the sum of every m is from 1 to about 30; and
   n is from 1 to 3; and
   a co-surfactant of formula (5a):

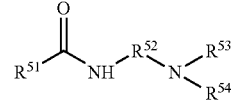

wherein
   $R^{51}$ is a substituted hydrocarbyl having an average of from about 5 carbon atoms to about 22 carbon atoms derived from a triglyceride, fatty acid, or methylester of a fatty acid and comprising at least one pendant hydroxyl or alkoxy group on the hydrocarbon chain;
   $R^{52}$ is $C_{1-4}$ alkylene; and
   $R^{53}$ and $R^{54}$ are $(R^{56}-O)_m R^{57}$, wherein $R^{56}$ in each of the $(R^{56}-O)$ groups is independently selected from $C_{1-4}$ alkylene, each $R^{57}$ is independently selected from hydrogen and $C_1$-$C_4$ alkyl, and each m is an average number such that the sum of every m is from 1 to about 30.

2. The composition of claim 1 wherein the co-surfactant component comprises a co-surfactant of formula (3a).

3. The composition of claim 2 wherein each of the $R^{37}$ groups is $(R^{34}-O)_m R^{35}$.

4. The composition of claim 2 wherein one $R^{37}$ group is $C(O)R^{33}$ and each other $R^{37}$ group is $(R^{34}-O)_m R^{35}$.

5. The composition of claim 2 wherein the co-surfactant of formula (3a) is of formula (3b):

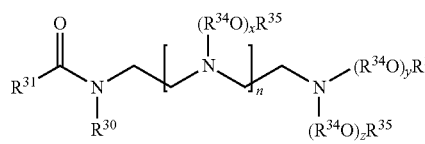

(3b)

wherein
$R^{31}$ is a straight or branched chain hydrocarbyl having an average of from about 5 carbon atoms to about 22 carbon atoms;
$R^{30}$ is selected from hydrogen and $(R^{34}-O)_m R^{35}$;
$R^{34}$ in each of the $(R^{34}-O)$ groups is independently selected from $C_{1-4}$ alkylene;
each $R^{35}$ is independently selected from hydrogen and $C_1$-$C_4$ alkyl;
n is from 1 to 3; and
each m, x, y, and z is an average number such that the sum of every m, x, y, and z is an average number of from 1 to about 30.

6. The composition of claim 2 wherein the co-surfactant of formula (3a) is of formula (3c):

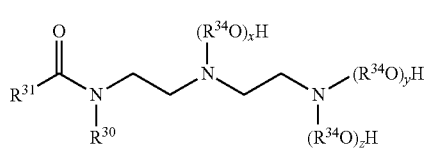

(3c)

wherein
$R^{31}$ is a straight or branched chain hydrocarbyl selected from the group consisting of alkyl and alkenyl, each having an average of from about 5 carbon atoms to about 22 carbon atoms;
$R^{30}$ is selected from hydrogen and $(R^{34}-O)_m R^{35}$;
$R^{34}$ in each of the $(R^{34}-O)$ groups is independently selected from $C_{1-4}$ alkylene;
$R^{35}$ is selected from hydrogen and $C_1$-$C_4$ alkyl; and
m, x, y and z are average numbers such that the sum of m, x, y, and z is an average number of from 1 to about 30.

7. The composition of claim 6 wherein at least one $R^{34}$ is different from at least one other $R^{34}$.

8. The composition of claim 2 wherein the co-surfactant of formula (3a) is of formula (3d):

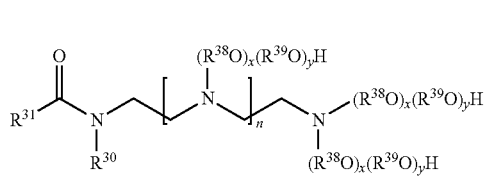

(3d)

wherein
$R^{31}$ is a straight or branched chain hydrocarbyl having an average of from about 5 carbon atoms to about 22 carbon atoms;
$R^{30}$ is selected from hydrogen and $(R^{34}-O)_m R^{35}$;
$R^{34}$ in each of the $(R^{34}-O)$ groups is independently selected from $C_{1-4}$ alkylene;
$R^{35}$ is selected from hydrogen and $C_1$-$C_4$ alkyl;
$R^{38}$ is $C_{1-4}$ alkylene;
$R^{39}$ is a $C_{1-4}$ alkylene different from $R^{38}$;
n is from 1 to 3; and
each m, x, and y is an average number such that the sum of every m, x, and y is from 1 to about 30.

9. The composition of claim 8 wherein $R^{38}$ is $C_2$-$C_4$ alkylene, and $R^{39}$ is a $C_2$-$C_4$ alkylene different from $R^{38}$.

10. The composition of claim 1 wherein the co-surfactant component comprises a co-surfactant of formula (5a).

11. The composition of claim 1 wherein the composition comprises glyphosate in a concentration of greater than 30 weight percent acid equivalent.

12. The composition of claim 1 wherein the weight ratio of glyphosate in grams acid equivalent to total surfactant in grams is from about 2:1 to about 10:1 or from about 3:1 to about 5:1.

13. The composition of claim 1 wherein the composition is a liquid concentrate, and the glyphosate concentration is greater than 360 grams acid equivalent per liter, greater than 420 grams acid equivalent per liter, greater than 480 grams acid equivalent per liter, greater than 500 grams acid equivalent per liter, greater than 540 grams acid equivalent per liter, greater than 580 grams acid equivalent per liter, greater than 600 grams acid equivalent per liter, or greater than 600 grams acid equivalent per liter.

14. The composition of claim 2 wherein $R^{31}$ is a straight-chain alkyl group having an average of from about 8 carbon atoms to about 18 carbon atoms.

15. The composition of claim 2 wherein each $R^{35}$ is independently selected from the group consisting of hydrogen and methyl.

16. The composition of claim 15 wherein every $R^{35}$ is hydrogen.

17. The composition of claim 15 wherein at least one $R^{35}$ is methyl.

18. The composition of claim 6 wherein each $R^{34}$ is independently selected from $C_2$-$C_4$ alkylene.

19. The composition of claim 18 wherein each $R^{34}$ is independently selected from the group consisting of ethylene and propylene.

20. A method of killing or controlling weeds or unwanted vegetation comprising:
diluting a composition of claim 1 in an amount of water to form an application mixture; and
applying a herbicidally effective amount of the application mixture to foliage of the weeds or unwanted vegetation.

* * * * *